United States Patent
Takagi et al.

(10) Patent No.: US 11,124,182 B2
(45) Date of Patent: Sep. 21, 2021

(54) SURROUNDINGS MONITORING APPARATUS

(71) Applicant: TOYOTA JIDOSHA KABUSHIKI KAISHA, Toyota (JP)

(72) Inventors: Toshihiro Takagi, Nisshin (JP); Yuki Minase, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 16/036,740

(22) Filed: Jul. 16, 2018

(65) Prior Publication Data

US 2019/0023267 A1  Jan. 24, 2019

(30) Foreign Application Priority Data

Jul. 18, 2017 (JP) .............................. JP2017-139229

(51) Int. Cl.
*B60W 30/09* (2012.01)
*G06K 9/00* (2006.01)

(52) U.S. Cl.
CPC ......... *B60W 30/09* (2013.01); *G06K 9/00805* (2013.01); *B60W 2554/00* (2020.02);
(Continued)

(58) Field of Classification Search
CPC ............. B60W 30/09; B60W 2550/10; B60W 2720/10; B60W 2420/42; G06K 9/00805; B60Y 2300/09; B60Y 2400/3015
See application file for complete search history.

(56) References Cited

U.S. PATENT DOCUMENTS

2004/0199327 A1* 10/2004 Isogai ................ B60K 31/0008
701/301
2005/0004762 A1* 1/2005 Takahama ............... G01S 17/87
701/301

(Continued)

FOREIGN PATENT DOCUMENTS

JP  2009151649 A  7/2009
JP  2011065338 A  3/2011

OTHER PUBLICATIONS

Murray R. Spiegel, PhD.—John Schiller, PhD.—R. Alu Srinivasan, PhD. Schaum's Outlines Probability and Statistics 3rd Edition (Year: 2009).*

*Primary Examiner* — Navid Ziaeianmehdizadeh
(74) *Attorney, Agent, or Firm* — Hunton Andrews Kurth LLP

(57) ABSTRACT

A surroundings monitoring apparatus obtains the position of an object from a captured image of a region in a heading direction of a vehicle, and obtains a position obtainment accuracy. When the distance between the object and the vehicle becomes relatively short, the position obtainment accuracy increases. However, the distance between the object and the vehicle becomes shorter, the position obtainment accuracy may decrease. Therefore, if collision avoidance control is performed for an object selected on the basis of the position obtainment accuracy, there is a possibility that the collision avoidance control is not performed for an object which is most likely to collide with the vehicle. In view of this, the apparatus obtains, for each object, a required deceleration which is the magnitude of acceleration necessary for stoppage at a position before the object, and performs the collision avoidance control for an object which is the largest in the required deceleration.

7 Claims, 11 Drawing Sheets

(52) U.S. Cl.
CPC ...... *B60W 2720/10* (2013.01); *B60Y 2300/09* (2013.01); *B60Y 2400/3015* (2013.01)

(56) References Cited

U.S. PATENT DOCUMENTS

| | | | | |
|---|---|---|---|---|
| 2013/0002470 A1* | 1/2013 | Kambe | ............... | G01S 13/867 342/55 |
| 2013/0226432 A1* | 8/2013 | Tsuruta | ............... | B60W 30/165 701/96 |
| 2013/0282252 A1* | 10/2013 | Takagi | ............... | B60T 7/22 701/70 |
| 2014/0333467 A1* | 11/2014 | Inomata | ............... | G01S 13/867 342/27 |
| 2015/0112566 A1* | 4/2015 | Takagi | ............... | G01S 15/46 701/70 |
| 2015/0219761 A1* | 8/2015 | Inomata | ............... | G08G 1/166 701/301 |
| 2017/0072851 A1* | 3/2017 | Shenoy | ............... | B60Q 9/008 |

* cited by examiner

SURROUNDINGS MONITORING APPARATUS

CROSS-REFERENCE TO RELATED APPLICATION

The present application claims priority to Japanese Patent Application No. 2017-139229 filed on Jul. 18, 2017, which is incorporated herein by reference in its entirety.

BACKGROUND OF THE INVENTION

Field of the Invention

The present invention relates to a surroundings monitoring apparatus which appropriately selects an object which is a target for collision avoidance control (hereinafter referred to as a "target object") from among objects detected by an onboard camera of a vehicle and which performs control for decreasing the travel speed of the vehicle so as to avoid collision with the target object.

Description of the Related Art

A known warning apparatus for a vehicle (hereinafter also referred to as the "conventional apparatus") executes a process (warning process) of providing a warning to a driver of the vehicle and/or a process (automatic braking process) of automatically generating a braking force when there is a high possibility that the vehicle will collide with an obstacle (object) detected by a millimeter wave radar (see, for example, Japanese Patent Application Laid-Open (kokai) No. 2009-151649).

The conventional apparatus imparts a target reliability to the object detected by the millimeter wave radar and determines whether to perform the warning process and the automatic braking process in accordance with the target reliability. The conventional apparatus sets the target reliability such that the longer the period during which the object is continuously detected, the greater the value to which the target reliability for that object is set.

Incidentally, there has been known a surroundings monitoring apparatus which includes an onboard camera, instead of or in addition to the millimeter wave radar, in order to detect an object present in the heading direction of the vehicle. In general, the surroundings monitoring apparatus of such a type extracts (recognizes) an object (e.g., pedestrian) contained in an image (heading direction image), captured by the onboard camera, through a so-called pattern matching process, and obtains the position (relative position) of the object in relation to the vehicle on the basis of the position of the object in the heading direction image.

The surroundings monitoring apparatus which obtains the position of an object through use of the onboard camera may be configured to determine the accuracy in obtaining the position of the object (camera detection reliability) and reflect the camera detection reliability on "control for avoiding collision of the vehicle with the object (collision avoidance control)." In such a case, the surroundings monitoring apparatus may set the camera detection reliability to increase with the degree of similarity between a portion of the image of the object appearing in the heading direction image and one of templates used for the pattern matching process.

In general, when the distance between the vehicle and the object becomes relatively short, the object in the heading direction image becomes clear. Consequently, the degree of similarity between the image of the object appearing in the heading direction image and the template used for the pattern matching process increases, and then, the camera detection reliability becomes high.

However, when the distance between the vehicle and the object becomes excessively short, the heading direction image does not include the entire image of the object, and consequently, the degree of similarity between the image of the object appearing in the heading direction image and the template decreases. In such a case, the camera detection reliability for that object is set to a small value so as to indicate that the camera detection reliability is low. Therefore, even in the case where the distance between the vehicle and the object is very short and the vehicle is highly likely to collide with the object as a result of traveling of the vehicle, the conventional apparatus may fail to appropriately perform the collision avoidance control for that object because of the low camera detection reliability of the object.

SUMMARY OF THE INVENTION

In view of the forgoing, one object of the present invention is to provide a surroundings monitoring apparatus which can appropriately select an object which is to be subjected to collision avoidance control from among objects extracted from a heading direction image and prevent a vehicle from colliding with the object.

A vehicle surroundings monitoring apparatus which achieves the above-described object (hereinafter also referred to as the "apparatus of the present invention") includes an onboard camera, a camera object position obtainment section, a camera control target candidate selection section, a control target object specifying section, and a control execution section.

Said onboard camera (camera apparatus 41) is mounted on a vehicle (10) and obtains a heading direction image by photographing a region in a heading direction of said vehicle.

Said camera object position obtainment section (camera processing section 41*b*) obtains camera detected positions (longitudinal position Dcx(a) and lateral position Dcy(a)) and reliability index values (reliability Rc) for camera detected objects (objects (a)) that are objects contained in said heading direction image, said camera detected positions being relative positions of said camera detected objects in relation to said vehicle determined on the basis of positions of said camera detected objects in said heading direction image, said reliability index values representing reliabilities in obtaining said camera detected positions.

Said camera control target candidate selection section (surroundings monitoring ECU 20) selects, as a camera control target candidate, one of said camera detected objects which are likely to collide with said vehicle when said vehicle travels (camera selected objects), in such a manner that, when there exists a single object (object (a)) having the largest required deceleration Dcrqmx which is the largest in camera required deceleration (Dcrq) which is the magnitude of acceleration of said vehicle required for avoiding collision with said camera detected object and is calculated on the basis of said camera detected position, said camera control target candidate selection section selects, as said camera control target candidate, the object which is the largest in said camera required deceleration (steps 930 and 935 of FIG. 9), and when there exist a plurality of objects which are the largest in said camera required deceleration, from among the plurality of objects which are the largest in said camera required deceleration, said camera control target candidate selection section selects, as said camera control target candidate, an object which is the highest in reliability (the maximum corrected reliability Rcmmx) represented by a reliability correlation value determined in accordance with said reliability index value (steps 940 and 945 of FIG. 9).

Said control target object specifying section (surroundings monitoring ECU 20) specifies said camera control target candidate as a control target object (step 760 of FIG. 7).

Said control execution section (surroundings monitoring ECU 20) executes a collision avoidance control for decreasing the magnitude of travel speed of said vehicle so as to avoid collision with said control target object (steps 775 to 795 of FIG. 7).

The apparatus of the present invention selects a control target object from among the objects extracted from the heading direction image and avoids collision with the control target object by performing the collision avoidance control. In addition, when the apparatus of the present invention selects the control target object, the apparatus of the present invention gives a higher priority to an object which is large in camera required deceleration over an object which is high in camera detection reliability.

If the apparatus of the present invention selects the control target object while giving a higher priority to an object which is high in camera detection reliability over an object which is large in camera required deceleration, there is a possibility that the collision avoidance control is not performed for an "object A whose camera detection reliability has decreased due to approach to the vehicle (an object which is very likely to collide with the vehicle in actuality)," and the collision avoidance control is performed for an "object B whose camera detection reliability is set to a large value because the object B is located relatively remote from the vehicle." For example, in this case, braking force is controlled by the collision avoidance control such that the vehicle stops at a position before the object B, and as a result, the vehicle is highly likely to collide with the object A before stopping.

In contrast, according to the apparatus of the present invention, an object which is large in camera required deceleration is selected as the control target object. Therefore, the collision avoidance control is performed for an object which is closer to the vehicle (in the above-described example, not the object B but the object A). Accordingly, the apparatus of the present invention allows appropriate selection of the control target object from among the objects extracted from the heading direction image, thereby increasing the possibility that collision of the vehicle with an object can be avoided by the collision avoidance control.

In one mode of the apparatus of the present invention, said camera object position obtainment section obtains said reliability index value every time a predetermined time (time interval $\Delta tc$) elapses; and said camera control target candidate selection section obtains said reliability correlation value (corrected reliability Rcm) by smoothing a change in said reliability index value with time (camera detection reliability correction process routine of FIG. 8).

When a camera detected object is extracted from the heading direction image, if an object (for example, a pedestrian) is similar in color to the background (for example, a road surface or wall surface) of that object, the possibility of unstable extraction of the contour (outline) of the object is high. In such a case, if the difference between the extracted contour of the object and the actual contour of the object (contour extraction error) is large, the camera detection reliability is small. Meanwhile, if the contour extraction error is small, the camera detection reliability is large. In other words, at the processing of detection of objects by utilizing the onboard camera, there may occur a phenomenon in which the camera detection reliability of a particular object changes within a short period of time.

In view of this, in the present mode of the apparatus of the present invention, the control target object is selected on the basis of the corrected reliability (namely, said reliability correlation value) obtained by smoothing a change in the camera detection reliability of a certain object. Therefore, according to the present mode, even when extraction of the contour of an object is unstable, the control target object can be selected more appropriately from among the camera detected objects.

In another mode of the apparatus of the present invention, when a longitudinal distance (Dcx) which is a distance between said camera detected object and said vehicle in a longitudinal direction of said vehicle is less than a predetermined distance threshold (Dth), said camera control target candidate selection section sets said camera required deceleration for said camera detected object to a predetermined deceleration (maximum deceleration Dmax) equal to or greater than the maximum value of said camera required deceleration calculated for said camera detected object when said longitudinal distance is greater than said distance threshold (steps 910 and 920 of FIG. 9).

When the collision avoidance control is executed, the magnitude of the travel speed of the vehicle decreases as the vehicle approaches an object selected as the control target object (object C). When the magnitude of the travel speed decreases, the camera required deceleration set for the object C decreases, and therefore, the difference between the camera required deceleration set for the object C and the camera required deceleration set for an object (object D) other than the control target object decreases. As a result, if the error in obtaining the camera detection position is somewhat large, the camera required deceleration for the object D obtained by the camera control target candidate selection section may become larger than the camera required deceleration for the object C. In such a case, the control target object may switch from the object C to the object D. If unnecessary "switching of the control target object" occurs, the target of the collision avoidance control changes, whereby an occupant(s) of the vehicle may feel an unpleasant sensation (a sense of discomfort).

In view of this, when the longitudinal distance between the vehicle and an object becomes short, the camera control target candidate selection section according to the present mode sets the "camera required deceleration for that object" to the predetermined deceleration greater than the "camera required decelerations for other objects" so that that object is selected as the control target object. As a result, according to the present mode, it is possible to avoid the occurrence of "switching of the control target object" during execution of the collision avoidance control, which switching would otherwise occur when the vehicle approaches the control target object and the magnitude of the travel speed decreases.

In still another mode of the apparatus of the present invention, there are further provided:

an object detector (a radar apparatus 42 and a sonar apparatus 43) which includes a transmission section for transmitting an electromagnetic wave or an acoustic wave as a transmission wave in said heading direction and a reception section for receiving a reflection wave generated as a result of said transmission wave being reflected by an object;

a detector object position obtainment section (a right-side rear radar 42a, a left-side rear radar 42b, and a sonar processing section 43e) which obtains detector detected positions (longitudinal position Drx(b) and lateral position Dry(b) and longitudinal position Dsx(c) and lateral position Dsy(c)) and detector detection reliabilities (reliability Rr(b) and reliability Rs(c)) for detector detected objects that are objects detected on the basis of said reflection wave (object (b) and object (c)), said detector detected positions being relative positions of said detector detected objects in relation to said vehicle, said detector detection reliabilities representing reliabilities in obtaining said detector detected positions; and a detector control target candidate selection section which selects, as a detector control target candidate, one of said detector detected objects which are likely to collide with said vehicle when said vehicle travels (radar selected objects and sonar selected objects), in such a manner that, when there exists a single object which has the maximum reliability (the maximum reliability Rrmx and the maximum reliability Rsmx), said detector control target candidate selection section selects said single object having the maximum reliability as said detector control target candidate (steps 1015 and 1020 of FIG. 10 and steps 1115 and 1120 of FIG. 11), and when there exist a plurality of objects which have the maximum reliability, from among the plurality of objects having the maximum reliability, said detector control target candidate selection section selects, as said detector control target candidate, an object (object (b) having the maximum required deceleration Drrqmx and object (c) having the maximum required deceleration Dsrqmx) which is the largest in detector required deceleration (required deceleration Drrq and required deceleration Dsrq) which is the magnitude of acceleration of said vehicle required for avoiding collision with said detector detected object and is calculated on the basis of said detector detected position (steps 1025 and 1030 of FIG. 10 and steps 1125 and 1130 of FIG. 11), wherein said control target object specifying section specifies, as said control target object, an object which is selected from among said camera control target candidate and said detector control target candidates and which has the largest required deceleration among said camera required deceleration and said detector required decelerations for those objects (step 760 of FIG. 7).

For example, the object detector obtains the detector detected position on the basis of the difference between the time when the transmission wave is transmitted and the time when the reflection wave is received. In addition, the object detector sets the detector detection reliability such that the greater the strength of the reflection wave, the greater the value to which the detector detection reliability is set. In general, when the distance between the vehicle and an object becomes short, the strength of the reflection wave increases, and thus, the detector detection reliability becomes higher. In view of this, in the present mode, when the apparatus of the present invention selects the detector control target candidate, unlike the camera control target candidate, the apparatus gives a higher priority to an object whose detector detection reliability is high over an object whose detector required deceleration is large. Therefore, according to the present mode, the control target object can be selected appropriately from among the camera detected objects and the detector detected objects.

Further, in the above-described mode, said object detector includes a radar apparatus (42) in which said transmission wave is an electromagnetic wave and a sonar apparatus (43) in which said transmission wave is an acoustic wave;

said detector control target candidate selection section selects, as said detector control target candidate associated with said radar apparatus, an object from among objects detected by said radar apparatus (steps 1015 to 1035 of FIG. 10) and selects, as said detector control target candidate associated with said sonar apparatus, an object from among objects detected by said sonar apparatus (steps 1115 to 1135 of FIG. 11); and said control target object specifying section specifies, as said control target object, an object which is selected from among said camera control target candidate, said detector control target candidate associated with said radar apparatus, and said detector control target candidate associated with said sonar apparatus and which has the largest required deceleration among said camera required deceleration and said detector required decelerations for those objects (step 760 of FIG. 7).

According to the present mode, even in the case where the object detector includes a radar apparatus and a sonar apparatus, the control target object can be selected appropriately from among an object(s) detected by the onboard camera (the camera detected object(s)), an object(s) detected by the radar apparatus, and an object(s) detected by the sonar apparatus.

Notably, in the above description, in order to facilitate understanding of the present invention, the constituent elements of the invention corresponding to those of an embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DESCRIPTION OF THE PREFERRED EMBODIMENT (Configuration)

Figure 1:
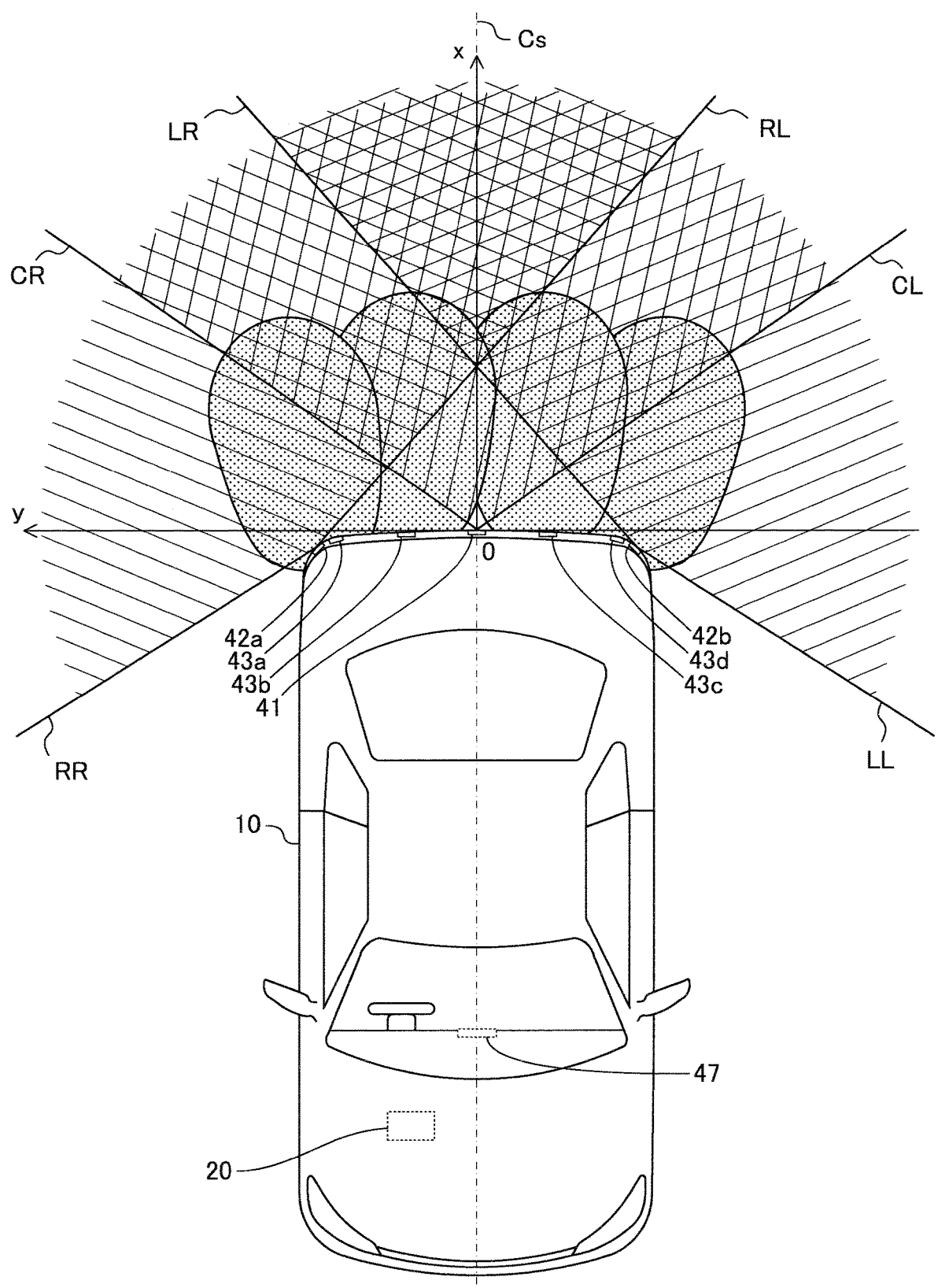
FIG. 1 is a schematic diagram of a vehicle (present vehicle) which includes a surroundings monitoring apparatus according to an embodiment of the present invention (present monitoring apparatus)

A surroundings monitoring apparatus according to an embodiment of the present invention (hereinafter also referred to as the "present monitoring apparatus") will be described with reference to the drawings. The present monitoring apparatus is applied to a vehicle 10 shown in FIG. 1. In addition, FIG. 2 shows a block diagram of the present monitoring apparatus. The present monitoring apparatus includes a "surroundings monitoring ECU 20, an engine ECU 31, and a brake ECU 32" each of which is an electric control unit (ECU).

The surroundings monitoring ECU 20 includes, as a main component, a microcomputer having a CPU, a ROM, and a RAM. The CPU performs data reading, numerical computation, output of computation results, etc. by repeatedly executing predetermined programs (routines). The ROM stores the programs executed by the CPU, lookup tables (maps), etc. The RAM stores data temporarily.

Like the surroundings monitoring ECU 20, each of the engine ECU 31 and the brake ECU 32 includes, as a main component, a microcomputer having a CPU, a ROM, and a RAM. These ECUs can perform data communication (can exchange data) with one another through a CAN (controller area network) 33. In addition, through the CAN 33, each ECU can receive output values of sensors connected to other ECUs from (via) the other ECUs.

The surroundings monitoring ECU 20 is connected to a camera apparatus 41, a radar apparatus 42, a sonar apparatus 43, a shift position sensor 44, a vehicle speed sensor 45, an acceleration sensor 46, an input output device 47, and speakers 48.

(Configuration—Camera Apparatus)

The camera apparatus 41 includes a rear camera 41a and a camera processing section 41b. The camera apparatus 41 is disposed at a central portion of the rear end of the vehicle 10. The rear camera 41a captures an image of a region in the backward direction of the vehicle 10 and outputs a signal representing the image to the camera processing section 41b at predetermined time intervals Δtc (fixed value). Hereinafter an image captured by the rear camera 41a will also be referred to as the "heading direction image" because the image is an image of a region located in the heading direction of the vehicle 10 when the vehicle 10 moves backward. Namely, the camera processing section 41b receives the heading direction image from the rear camera 41a every time the time intervals Δtc elapses. The angle of view (field of view) of the rear camera 41a in the horizontal direction is equal to a range represented by an angle formed between a straight line CR and a straight line CL shown in FIG. 1.

Figure 2:
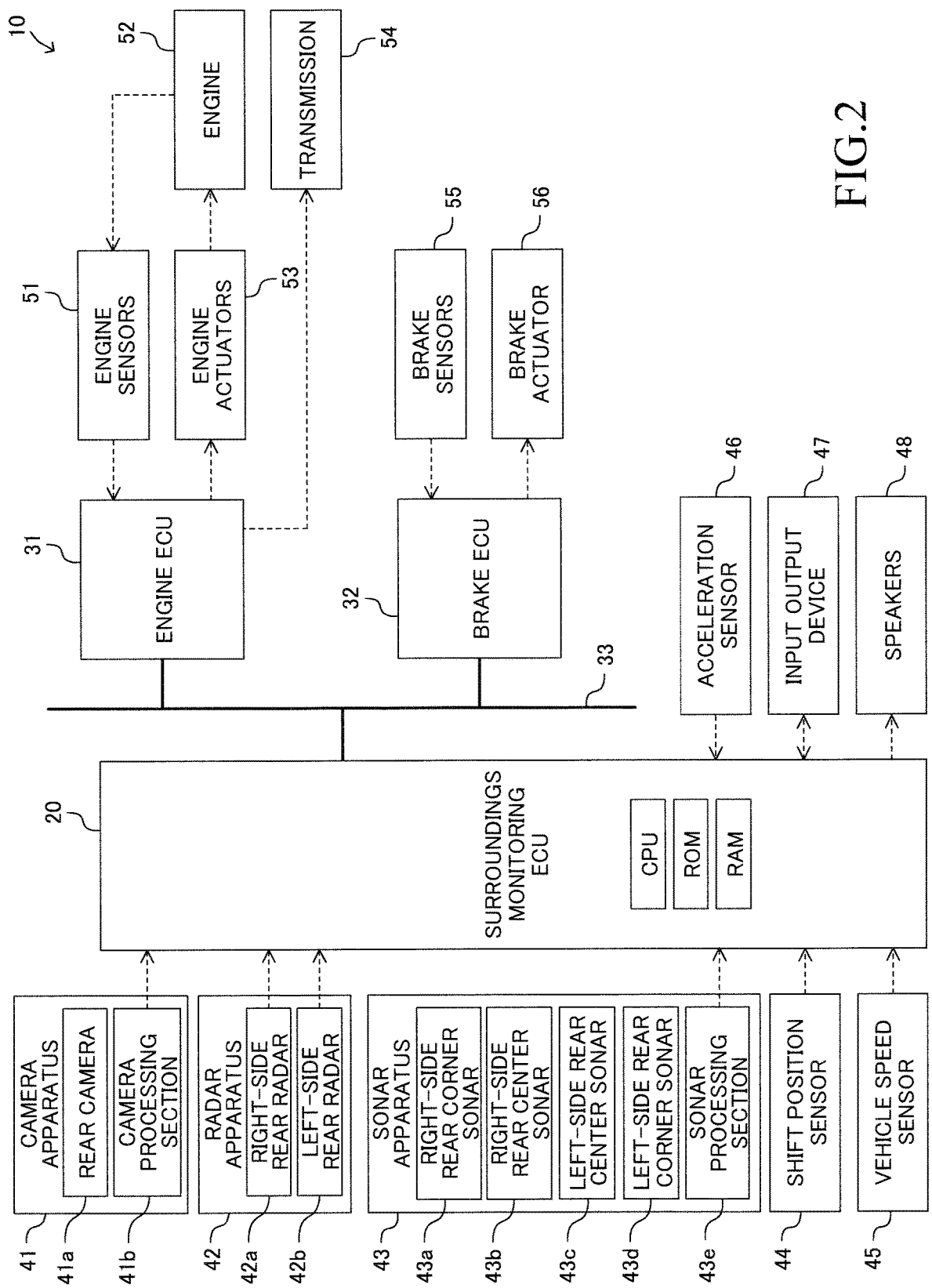
FIG. 2 is a block diagram of the present monitoring apparatus.

Notably, as shown in FIG. 1, the longitudinal direction of the vehicle 10 is defined as an x axis, and the lateral direction (width direction) of the vehicle 10 is defined as a y axis. Namely, the x axis and they axis are orthogonal to each other. The lateral center of the rear end of the vehicle 10 is the origin where x=0 and y=0. The x coordinate assumes a positive value on one side of the origin toward the backward direction of the vehicle 10 and assumes a negative value on the other side of the origin toward the forward direction of the vehicle 10. The y coordinate assumes a positive value on the left side with respect to the heading direction of the vehicle 10 moving backward and assumes a negative value on the right side with respect to the heading direction of the vehicle 10 moving backward.

At the time intervals Δtc, the camera processing section 41b extracts an object(s) (in particular, a pedestrian(s)) contained in the heading direction image. Hereinafter, the object extracted by the camera apparatus (specifically, the camera processing section 41b) will also be referred to as the "camera detected object" or "object (a)." "a" is an identifier which is assigned to each camera detected object by the camera processing section 41b and is a natural number in the present embodiment.

In order to extract an object from the heading direction image, the camera processing section 41b searches, from the heading direction image, a portion (area) which resembles one of many pedestrian templates (pedestrian patterns) stored in advance. If the camera processing section 41b finds a portion of the heading direction image, which portion resembles one of the pedestrian templates (namely, a portion of the heading direction image where the image of the pedestrian is present), the camera processing section 41b extracts the contour of the "pedestrian in the heading direction image" which corresponds to that pedestrian template. Namely, the camera processing section 41b extracts the contour of the pedestrian (object) contained in the heading direction image by a so-called pattern matching process.

When the camera detected object is extracted, the camera processing section 41b obtains, as reliability Rc(a), the degree of similarity between the pedestrian template and the portion of the heading direction image which resembles the pedestrian template. The reliability Rc(a) is represented by an integer of "0" to "3." The camera processing section 41b sets the reliability Rc(a) such that the greater the degree of similarity between the pedestrian template and the portion of the heading direction image, the greater the value to which the reliability Rc(a) is set.

Further, the camera processing section 41b obtains the longitudinal position Dcx(a) and the lateral position Dcy(a) of the object (a) on the basis of the position of the object (a) in the heading direction image. More specifically, the camera processing section 41b obtains an image longitudinal position Px(a) and an image lateral position Py(a) which represents the foot position of the pedestrian in the heading direction image.

Figure 3:
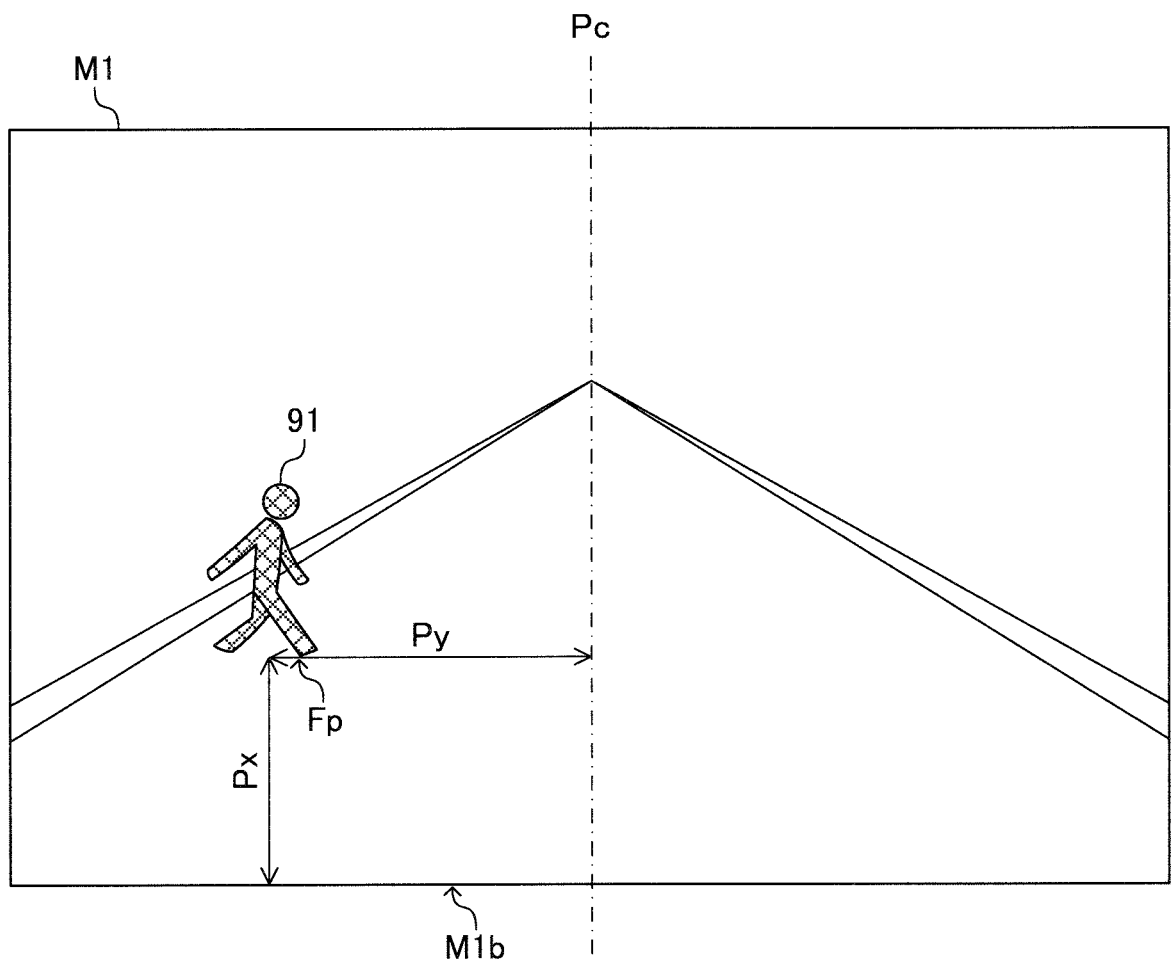
FIG. 3 is an illustration showing an example of a pedestrian appearing on a heading direction image.

FIG. 3 shows a heading direction image M1 from which the contour of a pedestrian 91 ("91" is assigned to the camera detected object as an identifier) has been extracted. As shown in FIG. 3, the image longitudinal position Px(91) is the length in the vertical direction between the lower end M1b of the heading direction image M1 and the lower end Fp of the pedestrian 91 in the heading direction image M1. Meanwhile, the magnitude |Py(a)| of the image lateral position Py(a) is the length in the lateral direction between the lateral center of the pedestrian 91 in the heading direction image and a center line Pc which is the lateral center of the heading direction image.

The value of the image longitudinal position Px(a) is "0" when the lower end of the pedestrian is located at the lower end of the heading direction image and the value changes such that the higher the lower end of the pedestrian in the heading direction image, the greater the image longitudinal position Px(a). Meanwhile, the image lateral position Py(a) is "0" when the lateral center of the pedestrian is located on the center line Pc. When the lateral center of the pedestrian is located on the left side of the center line Pc, the image lateral position Py(a) assumes a positive value, and the image lateral position Py(a) changes such that the greater the leftward separation of the lateral center of the pedestrian from the center line Pc, the greater the image lateral position Py(a). In addition, when the lateral center of the pedestrian is located on the right side of the center line Pc, the image lateral position Py(a) assumes a negative value, and the magnitude |Py(a)| of the image lateral position Py(a) changes such that the greater the rightward separation of the lateral center of the pedestrian from the center line Pc, the greater the magnitude |Py(a)| of the image lateral position Py(a).

The camera processing section 41b obtains (estimates) the longitudinal position Dcx(a) and the lateral position Dcy(a) from the image longitudinal position Px(a) and the image lateral position Py(a). Specifically, the greater the image longitudinal position Px(a), the greater the longitudinal position Dcx(a). Meanwhile, the greater the image longitudinal position Px(a), the greater the magnitude |Dcy(a)| of the lateral position Dcy(a), and the greater the magnitude |Py(a)| of the image lateral position Py(a), the greater the magnitude |Dcy(a)| of the lateral position Dcy(a).

In view of this, the camera processing section 41b obtains the longitudinal position Dcx(a) by applying the image longitudinal position Px(a) to a "lookup table which defines the relation between the image longitudinal position Px and the longitudinal position Dcx" which is stored in advance. In addition, the camera processing section 41b obtains the lateral position Dcy(a) by applying the image longitudinal position Px(a) and the image lateral position Py(a) to a "lookup table which defines the relation between the "image longitudinal position Px and the image lateral position Py" and the lateral position Dcy" which is stored in advance.

At the time intervals Δtc, the camera processing section 41b transmits a combination(s) of the longitudinal position Dcx(a), the lateral position Dcy(a), and the reliability Rc(a) to the surroundings monitoring ECU 20 as "camera object information."

(Configuration—Radar Apparatus)

The radar apparatus 42 includes a right-side rear radar 42a and a left-side rear radar 42b. As shown in FIG. 1, the right-side rear radar 42a is disposed at the rear-right corner of the vehicle 10. The right-side rear radar 42a includes a transmission section, a reception section (receiving section), and a processing section (none of these sections are shown in the drawings). The transmission section transmits a millimeter wave (electromagnetic wave whose frequency falls within the range of 30 GHz to 300 GHz). The millimeter wave transmitted by the transmission section will also be referred to as the "radar transmission wave."

The radar transmission wave from the transmission section of the right-side rear radar 42a propagates to a region between a straight line RR and a straight line RL. The reception section of the right-side rear radar 42a includes a plurality of reception antennas (not shown). A portion of the transmission wave is reflected by objects (e.g., a pedestrian and a wall surface) and is received by each of the reception antennas. The reflected transmission wave received by the reception section will also be referred to as the "radar reception wave." Every time a predetermined time elapses, the processing section of the right-side rear radar 42a obtains a position where the object is present and the relative speed of the object at that position on the basis of the radar transmission wave and the radar reception wave.

More specifically, the processing section obtains a plurality of beat signals by mixing each of the radar reception waves received by the reception antennas with the radar transmission wave. The processing section obtains the distance between the vehicle 10 and the object and the relative speed of the object on the basis of the frequencies and phases of the beat signals. Further, the processing section obtains the direction in which the object is present on the basis of the phase differences among the plurality of beat signals. Namely, the radar apparatus 42 (specifically, the right-side rear radar 42a, and the left-side rear radar 42b to be described later) obtains object information.

Hereinafter, the object associated with the object information obtained by the radar apparatus 42 will also be referred to as the "radar detected object" or "object (b)." "b" is an identifier which is assigned to each radar detected object by the processing section of the right-side rear radar 42a and the processing section of the left-side rear radar 42b. In the present embodiment, the identifier is a natural number. The range of values of the identifier "b" assigned by the processing section of the right-side rear radar 42a differs from the range of values of the identifier "b" assigned by the processing section of the left-side rear radar 42b. In other words, the values of the identifier "b" assigned by the processing section of the right-side rear radar 42a do not overlap with the values of the identifier "b" assigned by the processing section of the left-side rear radar 42b.

In the case where an object (b) is present at a certain angle (in a certain direction) in relation to the vehicle 10, the processing section obtains the distance and relative speed of the object at that angle, and calculates the longitudinal position Drx(b), the lateral position Dry(b), the relative longitudinal speed Vrx(b), and the relative lateral speed Vry(b) of the object on the x-y coordinate plane. The relative longitudinal speed Vrx(b) is the amount of change in the longitudinal position Drx(b) per unit time. The relative lateral speed Vry(b) is the amount of change in the lateral position Dry(b) per unit time.

In addition, the processing section determines a reliability Rr(b) for the detected object (b). The reliability Rr(b) is represented by an integer of "0" to "3." The higher the object detection reliability, the greater the value of the reliability Rr(b). The processing section sets the reliability Rr(b) such that the greater the strength of the radar reception wave (signal) from the object (b), the greater the value to which the reliability Rr(b) is set. Further, when the radar transmission wave is transmitted a plurality of times, the processing section sets the reliability Rr(b) such that the larger the number of times of reception of the radar reception wave from the object (b) by the reception section, the greater the value to which the reliability Rr(b) is set.

Every time a predetermined time elapses, the processing section transmits a combination(s) of the longitudinal position Drx(b), the relative longitudinal speed Vrx(b), the lateral position Dry(b), the relative lateral speed Vry(b), and the reliability Rr(b) to the surroundings monitoring ECU 20 as "radar object information."

Meanwhile, the left-side rear radar 42b is disposed at the rear-left corner of the vehicle 10. The left-side rear radar 42b has the same configuration as the right-side rear radar 42a. Namely, the left-side rear radar 42b includes a transmission section, a reception section, and a processing section (none of these sections are shown in the drawings).

The radar transmission wave from the transmission section of the left-side rear radar 42b propagates to a region between a straight line LR and a straight line LL. Every time a predetermined time elapses, the processing section of the left-side rear radar 42b transmits a combination(s) of the longitudinal position Drx(b), the relative longitudinal speed Vrx(b), the lateral position Dry(b), the relative lateral speed Vry(b), and the reliability Rr(b) to the surroundings monitoring ECU 20 as "radar object information."
(Configuration—Sonar Apparatus)

The sonar apparatus 43 includes four sonars (namely, a right-side rear corner sonar 43a, a right-side rear center sonar 43b, a left-side rear center sonar 43c, a left-side rear corner sonar 43d), and a sonar processing section 43e.

Each of the right-side rear corner sonar 43a, the right-side rear center sonar 43b, the left-side rear center sonar 43c, and the left-side rear corner sonar 43d includes a transmission section and a reception section (which are not shown in the drawings). At a proper timing, the sonar processing section 43e instructs each of the transmission sections to transmit an ultrasonic wave (hereinafter, the ultrasonic wave transmitted by the transmission sections will also be referred to as the "sonar transmission wave"). Each of the transmission sections of the sonar apparatus 43 transmits the sonar transmission wave in response to an instruction from the sonar processing section 43e.

Each of the reception sections of the sonar apparatus 43 operates as follows. Upon reception of a reflection wave of the sonar transmission wave (hereinafter, the reflection wave will also be referred to as the "sonar reception wave"), each reception section transmits to the sonar processing section 43e a signal which represents the frequency, strength, etc. of the sonar reception wave (hereinafter, the signal will also be referred to as the "reception wave signal").

For example, in some cases, not only the reception section of the right-side rear corner sonar 43a but also the reception section of the right-side rear center sonar 43b receives the sonar reception wave corresponding to the sonar transmission wave transmitted from the transmission section of the right-side rear corner sonar 43a. In such a case, immediately after the sonar processing section 43e has instructed the transmission section of the right-side rear corner sonar 43a to transmit the sonar transmission wave, the sonar processing section 43e receives the reception wave signals from both the reception section of the right-side rear corner sonar 43a and the reception section of the right-side rear center sonar 43b. In the following description, reception of the sonar reception wave corresponding to the sonar transmission wave from a certain sonar transmission section by a plurality of reception sections will also be referred to as "cross-detection."

As shown in FIG. 1, the right-side rear corner sonar 43a is disposed at the rear-right corner of the vehicle 10. The transmission section of the right-side rear corner sonar 43a transmits the sonar transmission wave toward a region located rightward and rearward of the vehicle 10.

The right-side rear center sonar 43b is disposed at the rear end of the vehicle 10 to be located on the "right side when the vehicle 10 moves forward" with respect to the lateral center of the vehicle 10. The transmission section of the right-side rear center sonar 43b transmits the sonar transmission wave toward a region located rearward of the vehicle 10.

The left-side rear center sonar 43c is disposed at the rear end of the vehicle 10 to be located on the "left side when the vehicle 10 moves forward" with respect to the lateral center of the vehicle 10. The transmission section of the left-side rear center sonar 43c transmits the sonar transmission wave toward a region located rearward of the vehicle 10.

The left-side rear corner sonar 43d is disposed at the rear-left corner of the vehicle 10. The transmission section of the left-side rear corner sonar 43d transmits the sonar transmission wave toward a region located leftward and rearward of the vehicle 10.

On the basis of the reception wave signals received from the reception sections of the four sonars, the sonar processing section 43e detects an object(s). Hereinafter, the object detected by the sonar apparatus 43 will also be referred to as the "sonar detected object" or "object (c)." "c" is an identifier which is assigned to each sonar detected object by the sonar processing section 43e and is a natural number in the present embodiment.

On the basis of the reception wave signals, the sonar processing section 43e obtains the longitudinal position Dsx(c), the lateral position Dsy(c), the relative longitudinal speed Vsx(c), and the relative lateral speed Vsy(c) of the object (c). The relative longitudinal speed Vsx(c) is the amount of change in the longitudinal position Dsx(c) per unit time. The relative lateral speed Vsy(c) is the amount of change in the lateral position Dsy(c) per unit time.

In addition, the sonar processing section 43e determines a reliability Rs(c) for the detected object (c). The reliability Rs(c) is represented by an integer of "0" to "3." The higher the object detection reliability, the greater the value of the reliability Rs(c). The sonar processing section 43e sets the reliability Rs(c) such that the greater the strength of the sonar reception wave (signal) from the object (c), the greater the value to which the reliability Rs(c) is set. Further, when the sonar transmission wave is transmitted a plurality of times, the sonar processing section 43e sets the reliability Rs(c) such that the larger the number of times of reception of the sonar reception wave from the object (c) by the reception section, the greater the value to which the reliability Rs(c) is set. In addition, in the case where cross-detection occurs for the object (c), the sonar processing section 43e sets the reliability Rs(c) to a larger value as compared with the case where such cross-detection does not occur.

Every time a predetermined time elapses, the sonar processing section 43e transmits a combination(s) of the longitudinal position Dsx(c), the lateral position Dsy(c), the relative longitudinal speed Vsx(c), the relative lateral speed Vsy(c), and the reliability Rs(c) to the surroundings monitoring ECU 20 as "sonar object information."
(Configuration—Others)

The shift position sensor 44 outputs to the surroundings monitoring ECU 20 a signal representing a travel mode (shift position) of the vehicle 10 selected by a driver's operation of a shift lever (not shown). Shift positions include a parking (P) range for parking, a drive (D) range for forward travelling, a reverse (R) range for backward travelling, a neutral (N) range for interrupting the transmission of torque from an engine 52 which is a drive source of the vehicle 10 to drive wheels (not shown) of the vehicle 10, and a low (L) range which is higher in gear ratio Rg than the drive (D) range. The gear ratio Rg is the ratio of the rotational speed of the engine 52 to the rotational speed of the drive wheels.

The vehicle speed sensor 45 outputs to the surroundings monitoring ECU 20 a signal representing the magnitude of the speed Vs of the vehicle 10. In the case where the shift position is a position other than the reverse (R) range, the surroundings monitoring ECU 20 handles the vehicle speed Vs as a positive value. Meanwhile, in the case where the shift position is the reverse (R) range, the surroundings monitoring ECU 20 handles the vehicle speed Vs as a negative value.

The acceleration sensor 46 outputs to the surroundings monitoring ECU 20 a signal representing the acceleration As of the vehicle 10 in the longitudinal direction (the amount of change in the vehicle speed Vs per unit time).

The input output device 47 is disposed on the dashboard (not shown) of the vehicle 10. The input output device 47 includes a display unit (liquid crystal display). Characters, figures, etc. displayed on the display unit of the input output device 47 are controlled by the surroundings monitoring ECU 20. The display unit of the input output device 47 also functions as a touch panel. Accordingly, the driver of the vehicle 10 can send instructions to the surroundings monitoring ECU 20 by touching the display unit. The driver can switch the state of request for collision avoidance control to be described later between an ON state and an OFF state by operating the input output device 47.

The speakers 48 are respectively disposed inside the left and right front doors (not shown) of the vehicle 10 (within the vehicle compartment). The speakers 48 can produce sounds such as a warning sound and a voice message in accordance with instructions from the surroundings monitoring ECU 20.

The engine ECU 31 is connected to a plurality of engine sensors 51 and receives detection signals from these sensors. The engine sensors 51 detect the operation state quantities of the engine 52. The engine sensors 51 include an accelerator pedal operation amount sensor, a throttle valve opening sensor, an engine rotational speed sensor, an intake air amount sensor, etc. The engine ECU 31 determines a requested drive torque Tr on the basis of the vehicle speed Vs, the output values of the engine sensors 51, etc.

Further, the engine ECU 31 is connected to engine actuators 53, such as a throttle valve actuator and a fuel injection valve, and a transmission 54. The engine ECU 31 changes the torque generated by the engine 52 and the gear ratio Rg of the transmission 54 by controlling the engine actuators 53 and the transmission 54 such that the drive torque Td transmitted to the drive wheels of the vehicle 10 becomes equal to the requested drive torque Tr. As a result, the acceleration As is controlled. Meanwhile, the surroundings monitoring ECU 20 drives the engine actuators 53 and the transmission 54 by sending a target drive torque Tqtgt to the engine ECU 31, to thereby render the drive torque Td coincident with the target drive torque Tqtgt.

The brake ECU 32 is connected to a plurality of brake sensors 55 and receives detection signals from these sensors. The brake sensors 55 detect parameters used for controlling an unillustrated brake system (specifically, hydraulic frictional brake system) mounted on the vehicle 10. The brake sensors 55 include an operation amount sensor for detecting the operation amount of a brake pedal (not shown), wheel speed sensors for detecting the rotational speeds of the wheels of the vehicle 10, etc.

Further, the brake ECU 32 is connected to a brake actuator 56. The brake actuator 56 is a hydraulic control actuator. The brake actuator 56 is provided in a hydraulic circuit extending between a master cylinder which pressurizes hydraulic oil by using the depressing force applied to the brake pedal and the friction brake including well-known wheel cylinders provided in the wheels. The hydraulic circuit, the master cylinder, and the friction brake are not shown in the drawings. The brake actuator 56 controls the oil pressure supplied to the wheel cylinders. The brake ECU 32 generates a brake force (frictional brake force) Bf applied to the wheels, by driving the brake actuator 56, so as to control the acceleration As of the vehicle 10 (specifically, the degree of decrease in the magnitude |Vs| of the vehicle speed Vs; namely, declaration). Meanwhile, the surroundings monitoring ECU 20 drives the brake actuator 56 by sending a target value of the deceleration to the brake ECU 32, to thereby control the braking force Bf.

(Collision Avoidance Control)

In the case where the vehicle 10 moves backward, if the possibility of collision with an object (e.g., a pedestrian or a wall surface) present in the rearward direction of the vehicle 10 is high, the surroundings monitoring ECU 20 executes collision avoidance control for warning the driver of the vehicle 10 and decreasing the magnitude of the vehicle speed Vs. In the following description, the object which is a target for the collision avoidance control for avoiding collision therewith will also be referred to as the "control target object." The surroundings monitoring ECU 20 selects (specifies), as the control target object, a certain object from among the camera detected object(s), the radar detected object(s), and the sonar detected object(s), the certain object being the highest in the possibility that the object collides with the vehicle 10 when the vehicle 10 moves backward.

For selection of the control target object, from among the camera detected objects, the surroundings monitoring ECU 20 selects, as a "camera control target candidate," an object which is most likely to collide with the vehicle 10 when the vehicle 10 moves backward. Similarly, from among the radar detected objects, the surroundings monitoring ECU 20 selects, as a "radar control target candidate," an object which is most likely to collide with the vehicle 10 when the vehicle 10 moves backward. In addition, from among the sonar detected objects, the surroundings monitoring ECU 20 selects, as a "sonar control target candidate," an object which is most likely to collide with the vehicle 10 when the vehicle 10 moves backward. Namely, the surroundings monitoring ECU 20 selects the control target object from among the camera control target candidate, the radar control target candidate, and the sonar control target candidate.

(Selection of Camera Control Target Candidate)

A method for selecting the camera control target candidate will be described. For selection of the camera control target candidate, the surroundings monitoring ECU 20 first extracts, from the camera detected object(s), an object which is likely to collide with the vehicle 10 when the vehicle 10 moves backward, and uses the extracted object(s) as a "camera selected object(s)."

In the case where the magnitude |Dcy(a)| of the lateral position Dcy(a) of a camera detected object is smaller than a value obtained by adding a predetermined width margin Ld to a half of the width Lw of the vehicle 10 (i.e., Lw/2); namely, in the case where |Dcy(a)|<Lw/2+Ld, the surroundings monitoring ECU 20 determines that the camera detected object is the camera selected object.

The surroundings monitoring ECU 20 selects the camera control target candidate from among the camera selected object(s) on the basis of the required deceleration Dcrq(a) and the corrected reliability Rcm(a). The required deceleration Dcrq(a) is the magnitude of the acceleration As necessary for the vehicle 10 to stop at a positon before the object (a). Meanwhile, the corrected reliability Rcm(a) is a value obtained through a "reliability correction process" of smoothing changes in the reliability Rc(a) with time.

First, the reason for executing the reliability correction process will be described. In some cases, even when the relative position (in the longitudinal direction) of an object (in particular, a pedestrian) in relation to the vehicle 10 is approximately constant, the reliability Rc(a) may change. Such a change in the reliability Rc(a) is highly likely to occur in the case where the color of the clothes of a pedestrian resembles the color of the background (e.g., road surface or wall surface) when the pedestrian is viewed from the rear camera 41a.

If the clothes of the pedestrian are similar in color to the background, there is a high possibility that a large error will be produced between the contour of a pedestrian extracted from the heading direction image through the pattern matching process by the camera processing section 41b and the actual contour of the pedestrian. In this case, if the error involved in the extraction of the contour of the pedestrian becomes large, the reliability Rc(a) becomes low. Meanwhile, if the contour of the pedestrian is extracted relatively accurately, the reliability Rc(a) becomes high. As a result, the reliability Rc(a) may change (fluctuate).

Therefore, if the surroundings monitoring ECU 20 selects the camera control target candidate on the basis of the reliability Rc(a) (instead of the corrected reliability Rcm(a)), a phenomenon (control target object changing phenomenon) in which the control target object selected by the process described below is switched between an object whose reliability Rc(a) changes and another object within a short period of time is likely to occur. If such a control target object changing phenomenon occurs, the control target for which the collision avoidance control is performed is switched within a short period of time, and the travel state of the vehicle 10 becomes unstable, whereby the occupant(s) of the vehicle 10 may feel an unpleasant sensation. In view of this, the surroundings monitoring ECU 20 selects the camera control target candidate on the basis of the corrected reliability Rcm(a) obtained through the reliability correction process (i.e., smoothing process), thereby preventing occurrence of the control target object changing phenomenon.

At the time of execution of the reliability correction process, the surroundings monitoring ECU 20 obtains the corrected reliability Rcm(a) for the object (a) on the basis of three latest reliabilities Rc(a) of the camera detected object (a) (i.e., reliability Rc0(a), reliability Rc1(a), and reliability Rc2(a)) and the previous corrected reliability Rcmp(a) which is the corrected reliability Rcm(a) obtained when the reliability correction process was executed by the surroundings monitoring ECU 20 last time.

The reliability Rc0(a) is the (latest) reliability Rc(a) of the camera object information for the object (a) which was obtained last. The reliability Rc1(a) is the reliability Rc(a) for the object (a) which was obtained at a point in time prior to the point at which the reliability Rc0(a) was obtained by the time interval Δtc. The reliability Rc2(a) is the reliability Rc(a) for the object (a) which was obtained at a point in time prior to the point at which the reliability Rc1(a) was obtained by the time interval Δtc.

The surroundings monitoring ECU 20 obtains a maximum reliability Rcmax(a) which is the largest one of the reliability Rc0(a), the reliability Rc1(a), and the reliability Rc2(a). In addition, the surroundings monitoring ECU 20 obtains a minimum reliability Rcmin(a) which is the smallest one of the reliability Rc0(a), the reliability Rc1(a), and the reliability Rc2(a).

If the previous corrected reliability Rcmp(a) is equal to or greater than the maximum reliability Rcmax(a) (namely, Rcmp(a) Rcmax(a)), the surroundings monitoring ECU 20 stores a value equal to the maximum reliability Rcmax(a) as a new value of the corrected reliability Rcm(a) (namely, Rcm(a)←Rcmax(a)).

Meanwhile, if the previous corrected reliability Rcmp(a) is equal to or less than the minimum reliability Rcmin(a) (namely, Rcmp(a) Rcmin(a)), the surroundings monitoring ECU 20 stores a value equal to the minimum reliability Rcmin(a) as a new value of the corrected reliability Rcm(a) (namely, Rcm(a)←Rcmin(a)).

Further, if the previous corrected reliability Rcmp(a) is less than the maximum reliability Rcmax(a) and greater than the minimum reliability Rcmin(a) (namely, Rcmin(a)<Rcmp(a)<Rcmax(a)), the surroundings monitoring ECU 20 stores a value equal to the previous corrected reliability Rcmp(a) as a new value of the corrected reliability Rcm(a) (namely, Rcm(a)←Rcmp(a)).

Figure 4:
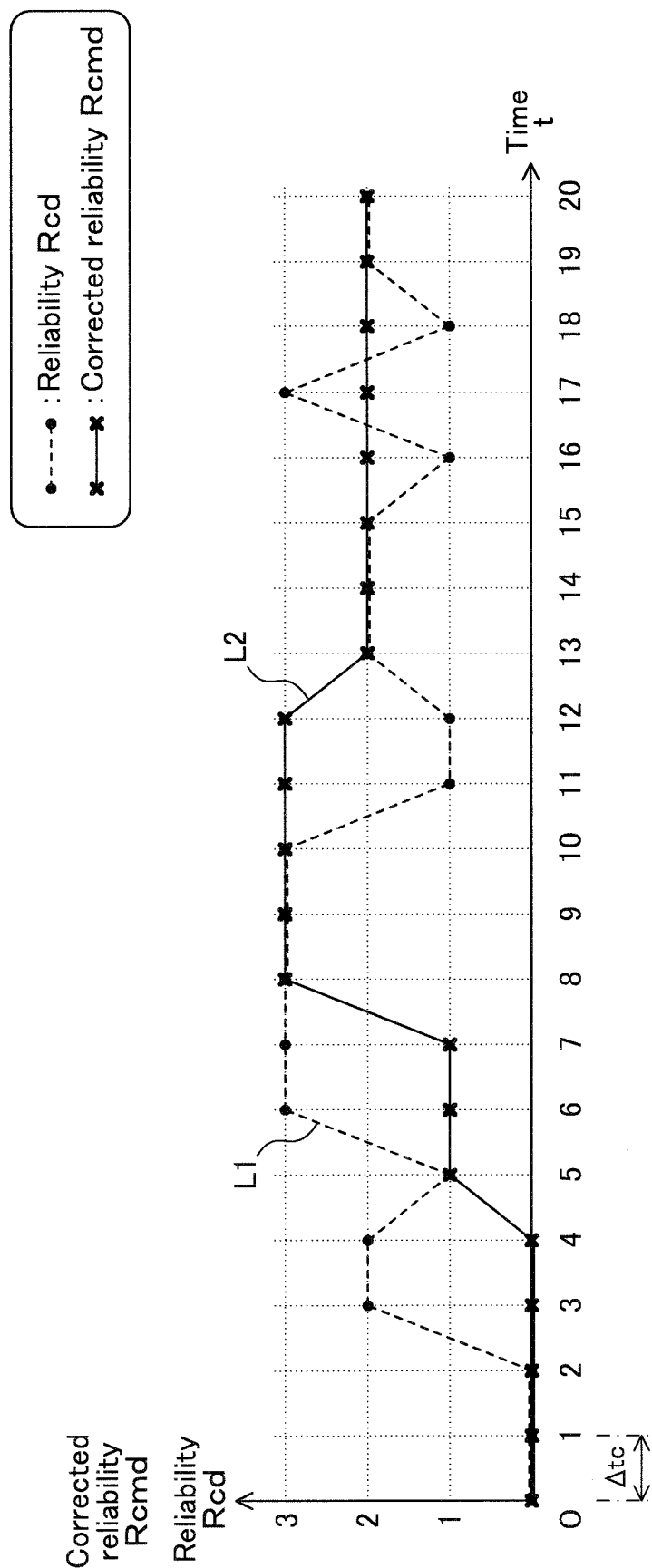
FIG. 4 is a graph showing changes in reliability and corrected reliability.

The relation between the reliability Rc(a) and the corrected reliability Rcm(a) will be described with reference to an example of FIG. 4. FIG. 4 is a graph showing changes in the reliability Rc(a) and the corrected reliability Rcm(a) for the object (a). A broken line L1 of FIG. 4 represents changes in the reliability Rc(a). A continuous line L2 of FIG. 4 represents changes in the corrected reliability Rcm (a).

For example, at time t=7, the three latest values of the reliability Rc(a) are "3" (the reliability Rc0(a)), "3" (the reliability Rc1(a)), and "1" (the reliability Rc2(a)). Accordingly, the maximum reliability Rcmax(a) is "3" and the minimum reliability Rcmin(a) "1." Meanwhile, the previous corrected reliability Rcmp(a) is "1." In this case, since the previous corrected reliability Rcmp(a) (=1) is equal to or less than the minimum reliability Rcmin(a) (=1), the surroundings monitoring ECU 20 stores, as the corrected reliability Rcm(a), a value equal to the minimum reliability Rcmin(a) (in this case, "1").

Next, the case where the corrected reliability Rcm(a) is set to a value greater than the previous corrected reliability Rcmp(a) will be described. At time t=8, the three latest values of the reliability Rc(a) are "3" (the reliability Rc0(a)), "3" (the reliability Rc1(a)), and "3" (the reliability Rc2(a)). Accordingly, the maximum reliability Rcmax(a) is "3" and the minimum reliability Rcmin(a) is "3." Meanwhile, the previous corrected reliability Rcmp(a) is "1." In this case, since the previous corrected reliability Rcmp(a) (=1) is equal to or less than the minimum reliability Rcmin(a) (=3), the surroundings monitoring ECU 20 stores, as the corrected reliability Rcm(a), a value equal to the minimum reliability Rcmin(a) (in this case, "3").

Next, the case where the corrected reliability Rcm(a) is set to a value less than the previous corrected reliability Rcmp(a) will be described. At time t=13, the three latest values of the reliability Rc(a) are "2" (the reliability Rc0(a)), "1" (the reliability Rc1(a)), and "1" (the reliability Rc2(a)). Accordingly, the maximum reliability Rcmax(a) is "2" and the minimum reliability Rcmin(a) is "1." Meanwhile, the previous corrected reliability Rcmp(a) is "3." In this case, since the previous corrected reliability Rcmp(a) (=3) is equal to or greater than the maximum reliability Rcmax(a) (=2), the surroundings monitoring ECU 20 stores, as the corrected reliability Rcm(a), a value equal to the maximum reliability Rcmax(a) (in this case, "2").

Next, the case where the corrected reliability Rcm(a) is set to a value equal to the previous corrected reliability Rcmp(a) when the reliability Rc(a) is changing (fluctuating). At time t=18, the three latest values of the reliability Rc(a) are "1" (the reliability Rc0(a)), "3" (the reliability Rc1(a)), and "1" (the reliability Rc2(a)). Accordingly, the maximum reliability Rcmax(a) is "3" and the minimum reliability Rcmin(a) is "1." Meanwhile, the previous corrected reliability Rcmp(a) is "2." In this case, since the previous corrected reliability Rcmp(a) (=2) is less than the maximum reliability Rcmax(a) (=3) and greater than the minimum reliability Rcmin(a) (=1), the surroundings monitoring ECU 20 stores, as the corrected reliability Rcm(a), a value equal to the previous corrected reliability Rcmp(a) (in this case, "2").

After having obtained the corrected reliability Rcm(a) for each camera detected object, the surroundings monitoring ECU 20 calculates the relative longitudinal speed Vcx(a) of each camera selected object (object (a)). Notably, the surroundings monitoring ECU 20 may perform the reliability correction process for the camera selected objects only. In the present embodiment, the surroundings monitoring ECU 20 performs the reliability correction process for all the camera detected objects. This makes it possible to obtain the corrected reliability Rcm(a) even immediately after an object (a) which had not been a camera selected object has become a camera selected object.

Next, a specific operation for calculating the relative longitudinal speed Vcx(a) will be described. For the object (a), the surroundings monitoring ECU 20 calculates the relative longitudinal speed Vcx(a), in accordance with the following expression (1), on the basis of the longitudinal position Dcx(a) of the corresponding camera selected object received from the camera processing section 41b latest and the previous longitudinal position Dcxp(a) which is the longitudinal position Dcx(a) contained in the camera object information received from the camera processing section 41b last time (namely, obtained at a point in time prior to the present point in time by the time interval Δtc).

$$Vcx(a)=(Dcx(a)-Dcxp(a))/\Delta tc \quad (1)$$

Further, the surroundings monitoring ECU 20 calculates the required deceleration Dcrq(a) associated with the object (a) in accordance with the following expression (2). The required deceleration Dcrq(a) is the magnitude of an acceleration As required for the vehicle 10 to stop at a position which is offset from the object (a) toward the near side by a predetermined stop position margin Lv. Accordingly, the value of the required deceleration Dcrq(a) is "0" or greater than "0" (namely, Dcrq(a)≥0).

$$Dcrq(a)=(\tfrac{1}{2})\cdot(Vcx(a))^2/(Dcx(a)-Lv) \quad (2)$$

However, if the longitudinal position Dcx(a) is positive and is smaller than a predetermined distance threshold Dth (namely, 0<Dcx(a)<Dth), the surroundings monitoring ECU 20 sets the required deceleration Dcrq(a) to a predetermined maximum deceleration Dmax. The maximum deceleration Dmax is set to the maximum value of deceleration which the vehicle 10 can produce in an ordinary travel state. The distance threshold Dth is set to the distance between the object (a) and the vehicle 10 at the time when the the object (a) and the vehicle 10 are very close to each other and the vehicle 10 must be braked with the maximum deceleration Dmax. However, the distance threshold Dth is set to a value greater than the stop position margin Lv.

As a result of the required deceleration Dcrq(a) being set to the predetermined maximum deceleration Dmax, that object (a) is selected as the control target object by a process described later. Therefore, even when the vehicle 10 approaches that object (a) while being decelerated by the collision avoidance control, and the magnitude |Vs| of the vehicle speed Vs becomes small so that the required deceleration Dcrq(a) calculated in accordance with the above-described expression (2) becomes considerably small, that object (a) is continuously selected as the control target object. Therefore, it is possible to avoid occurrence of a problematic situation in which an object other than that object (a) (namely, an object which is located more remote from the vehicle 10 than the object (a)) is selected as the control target object, whereby the execution state of the collision avoidance control changes, and as a result, the occupant(s) of the vehicle 10 feels an unpleasant sensation.

After having obtained (calculated) the required deceleration Dcrq(a) for each camera selected object, the surroundings monitoring ECU 20 specifies a camera selected object (object (a)) whose required deceleration Dcrq(a) is the maximum. Notably, the maximum value of the required deceleration Dcrq(a) will also be referred to as the "maximum required deceleration Dcrqmx." In some cases, a plurality of camera selected objects have the same maximum required deceleration Dcrqmx.

In the case where, of the camera selected objects (objects (a)), a "single" camera selected object has the maximum required deceleration Dcrqmx, the surroundings monitoring ECU 20 selects, as the camera control target candidate, the camera selected object having the maximum required deceleration Dcrqmx. Meanwhile, in the case where a plurality of camera selected objects have the maximum required deceleration Dcrqmx, the surroundings monitoring ECU 20 selects, as the camera control target candidate, a camera selected object whose corrected reliability Rcm(a) is the maximum from among the camera selected objects which have the maximum required deceleration Dcrqmx. Notably, the maximum value of the corrected reliability Rcm(a) will also be referred to as the "maximum corrected reliability Rcmmx."

In the case where a plurality of camera selected objects have the same maximum required deceleration Dcrqmx and the same maximum corrected reliability Rcmmx, the surroundings monitoring ECU 20 selects, as the camera control target candidate, a camera selected object whose longitudinal position Dcx(a) is the minimum from among those camera selected objects. The minimum value of the longitudinal position Dcx(a) will also be referred to as the "minimum longitudinal position Dcxmn."

(Selection of Radar Control Target Candidate)

Next, a method for selecting a radar control target candidate will be described. For selection of the radar control target candidate, the surroundings monitoring ECU 20 first extracts, from the radar detected object(s), an object which is likely to collide with the vehicle 10 when the vehicle 10 moves backward, and uses the extracted object(s) as a "radar selected object(s)."

In the case where the magnitude |Dry(b)| of the lateral position Dry(b) of a radar detected object is smaller than the value obtained by adding the predetermined width margin Ld to a half of the vehicle width Lw (i.e., Lw/2); namely, in the case where |Dry(b)|<Lw/2+Ld, the surroundings monitoring ECU 20 determines that that radar detected object is the radar selected object.

The surroundings monitoring ECU 20 selects the radar control target candidate from among the radar selected object(s) on the basis of the reliability Rr(b) and the required deceleration Drrq(b). Notably, the maximum value of the reliability Rr(b) will also be referred to as the "maximum reliability Rrmx." More specifically, in the case where, of the radar selected objects (objects (b)), a "single" radar selected object has the maximum reliability Rrmx, the surroundings monitoring ECU 20 selects, as the radar control target candidate, the radar selected object having the maximum reliability Rrmx.

Meanwhile, in the case where a plurality of radar selected objects have the same maximum reliability Rrmx, the surroundings monitoring ECU 20 selects, as the radar control target candidate, a radar selected object whose required deceleration Drrq(b) is the maximum from among the radar selected objects having the maximum reliability Rrmx. The maximum value of the required deceleration Drrq(b) will also be referred to as the "maximum required deceleration Drrqmx."

In order to specify the radar selected object (object (b)) having the maximum required deceleration Drrqmx, the surroundings monitoring ECU 20 calculates the required deceleration Drrq in accordance with the following expression (3) for each of the objects (b) having the maximum reliability Rrmx.

$$Drrq(b)=(1/2) \cdot (Vrx(b))^2/(Drx(b)-Lv) \tag{3}$$

In the case where a plurality of radar selected objects have the same maximum reliability Rrmx and the same maximum required deceleration Drrqmx, the surroundings monitoring ECU 20 selects, as the radar control target candidate, a radar selected object whose longitudinal position Drx(b) is the minimum from among those radar selected objects. The minimum value of the longitudinal position Drx(b) among those radar selected objects will also be referred to as the "minimum longitudinal position Drxmn."

(Selection of Sonar Control Target Candidate)

Next, a method for selecting a sonar control target candidate will be described. For selection of the sonar control target candidate, the surroundings monitoring ECU 20 first extracts, from the sonar detected object(s), an object which is likely to collide with the vehicle 10 when the vehicle 10 moves backward, and uses the extracted object(s) as a "sonar selected object(s)."

In the case where the magnitude |Dsy(c)| of the lateral position Dsy(c) of a sonar detected object is smaller than the value obtained by adding the predetermined width margin Ld to a half of the vehicle width Lw (i.e., Lw/2); namely, in the case where |Dsy(c)|<Lw/2+Ld, the surroundings monitoring ECU 20 determines that that sonar detected object is the sonar selected object.

The surroundings monitoring ECU 20 selects the sonar control target candidate from among the sonar selected object(s) on the basis of the reliability Rs(c) and the required deceleration Dsrq(c). Notably, the maximum value of the reliability Rs(c) will also be referred to as the "maximum reliability Rsmx." More specifically, in the case where, of the sonar selected objects (objects (c)), a "single" sonar selected object has the maximum reliability Rsmx, the surroundings monitoring ECU 20 selects, as the sonar control target candidate, the sonar selected object having the maximum reliability Rsmx.

Meanwhile, in the case where a plurality of sonar selected objects have the same maximum reliability Rsmx, the surroundings monitoring ECU 20 selects, as the sonar control target candidate, a sonar selected object whose required deceleration Dsrq(b) is the maximum from among the sonar selected objects having the maximum reliability Rsmx. The maximum value of the required deceleration Dsrq(b) will also be referred to as the "maximum required deceleration Dsrqmx."

In order to specify the sonar selected object (object (c)) having the maximum required deceleration Dsrqmx, the surroundings monitoring ECU 20 calculates the required deceleration Dsrq in accordance with the following expression (4) for each of the objects (c) having the maximum reliability Rsmx.

$$Dsrq(c)=(1/2) \cdot (Vsx(c))^2/(Dsx(c)-Lv) \tag{4}$$

In the case where a plurality of sonar selected objects have the same maximum reliability Rsmx and the same maximum required deceleration Dsrqmx, the surroundings monitoring ECU 20 selects, as the sonar control target candidate, a sonar selected object whose longitudinal position Dsx(c) is the minimum from among those sonar selected objects. The minimum value of the longitudinal position Dsx(c) among those the sonar selected objects will also be referred to as the "minimum longitudinal position Dsxmn."

(Selection of Control Target Object and Collision Avoidance Control for Control Target Object)

As described above, the surroundings monitoring ECU 20 selects a control target object from the camera control target candidate, the sonar control target candidate, and the radar control target candidate. Specifically, the surroundings monitoring ECU 20 selects, as the control target object, an object having the maximum required deceleration among the required deceleration Dcrq(a), the required deceleration Dsrq(b), and the required deceleration Drrq(c) for those objects.

In the following description, the required deceleration of the control target object (namely, one of the maximum required deceleration Dcrqmx, the maximum required deceleration Dsrqmx, and the maximum required deceleration Drrqmx) will also be referred to as the "control deceleration Ddrq." In the following description, the reliability of the control target object (namely, one of the reliability Rc(a), the reliability Rr(b), and the reliability Rs(c)) will also be referred to as the "control reliability Rd."

In the case where the control deceleration Ddrq is greater than a predetermined acceleration threshold Ath and the control reliability Rd is equal to or greater than "1" (namely, the control reliability Rd is not "0"), the surroundings monitoring ECU 20 decreases the magnitude of the vehicle speed Vs by executing the collision avoidance control. In addition, in this case, the surroundings monitoring ECU 20 notifies the driver of the vehicle 10 of the presence of the control target object.

More specifically, when the control reliability Rd is "3," the surroundings monitoring ECU 20 causes the brake actuator 56 to generate the braking force Bf such that the magnitude of the acceleration As of the vehicle 10 becomes equal to the control deceleration Ddrq, whereby the magnitude of the vehicle speed Vs decreases.

Namely, the surroundings monitoring ECU 20 sends request signals to the engine ECU 31 and the brake ECU 32 such that the magnitude |As| of the actual acceleration As becomes equal to the control deceleration Ddrq. Specifically, the surroundings monitoring ECU 20 sets the target drive torque Tqtgt to "0" and sends a request signal to the engine ECU 31 so as to render the actual drive torque Td coincident with the target drive torque Tqtgt. In addition, the surroundings monitoring ECU 20 requests the brake ECU 32 to generate the braking force Bf for rendering the magnitude |As| of the actual acceleration As coincident with the control deceleration Ddrq.

In addition, when the control reliability Rd is "2," the surroundings monitoring ECU 20 sets the target drive torque Tqtgt to "0" and sends a request signal to the engine ECU 31 so as to render the actual drive torque Td coincident with the target drive torque Tqtgt. Meanwhile, the surroundings monitoring ECU 20 does not cause the brake actuator 56 to generate the braking force Bf.

Further, when the control reliability Rd is "1," the surroundings monitoring ECU 20 sends a request signal to the engine ECU 31 such that the drive torque Td decreases. Specifically, if the requested drive torque Tr is greater than a predetermined torque threshold Tth, the surroundings monitoring ECU 20 sets the target drive torque Tqtgt to a value obtained by multiplying the torque threshold Tth by a predetermined coefficient k (where 0<k<1) (namely, Tqtgt←k·Tth). Meanwhile, if the requested drive torque Tr is equal to or less than the torque threshold Tth, the surroundings monitoring ECU 20 sets the target drive torque Tqtgt to a value obtained by multiplying the requested drive torque Tr by the coefficient k (namely, Tqtgt←k·Tr). Subsequently, the surroundings monitoring ECU 20 sends a request signal to the engine ECU 31 such that the actual drive torque Td coincides with the target drive torque Tqtgt.

(Consideration on Method for Selecting Camera Control Target Candidate)

As described above, when the surroundings monitoring ECU 20 selects the camera control target candidate, the surroundings monitoring ECU 20 gives a higher priority to the required deceleration Dcrq(a) over the reliability Rc(a) (in actuality, the corrected reliability Rcmp(a)). Meanwhile, when the surroundings monitoring ECU 20 selects the radar control target candidate and the sonar control target candidate, the surroundings monitoring ECU 20 gives a higher priority to the reliability Rr(b) and the reliability Rs(c) over the required deceleration Drrq(b) and the required deceleration Dsrq(c). The reason why a higher priority is given to the required deceleration Dcrq(a) over the reliability Rc(a) for the selection of the camera control target candidate will now be described.

In general, as to the radar detected object, the smaller the longitudinal position Drx(b) of the object (b), the greater the strength of the radar reception wave from the object (b). Similarly, as to the sonar detected object, the smaller the longitudinal position Dsx(c) of the object (c), the greater the strength of the sonar reception wave from the object (c) and the greater the possibility of occurrence of cross-detection. Therefore, as to the radar detected object and the sonar detected object, the smaller the values of the longitudinal position Drx(b) and the longitudinal position Dsx(c), the higher the detection accuracy. Thus, a higher priority is given to the reliability Rr(b) and the reliability Rs(c) for selection of the radar control target candidate and the sonar control target candidate.

Meanwhile, as to the camera detected object, the accuracy in detecting the object increases when the longitudinal position Dcx(a) becomes relatively small; however, the accuracy in detecting the object tends to decrease when the longitudinal position Dcx(a) becomes smaller. More specifically, when the distance between the vehicle 10 and a pedestrian present rearward of the vehicle 10 becomes relatively short, the image of the pedestrian in the heading direction image becomes relatively large and clear. As a result, the degree of similarity between the pedestrian in the heading direction image and a pedestrian template tends to increase and the reliability Rc(a) tends to increase.

Figure 5A:
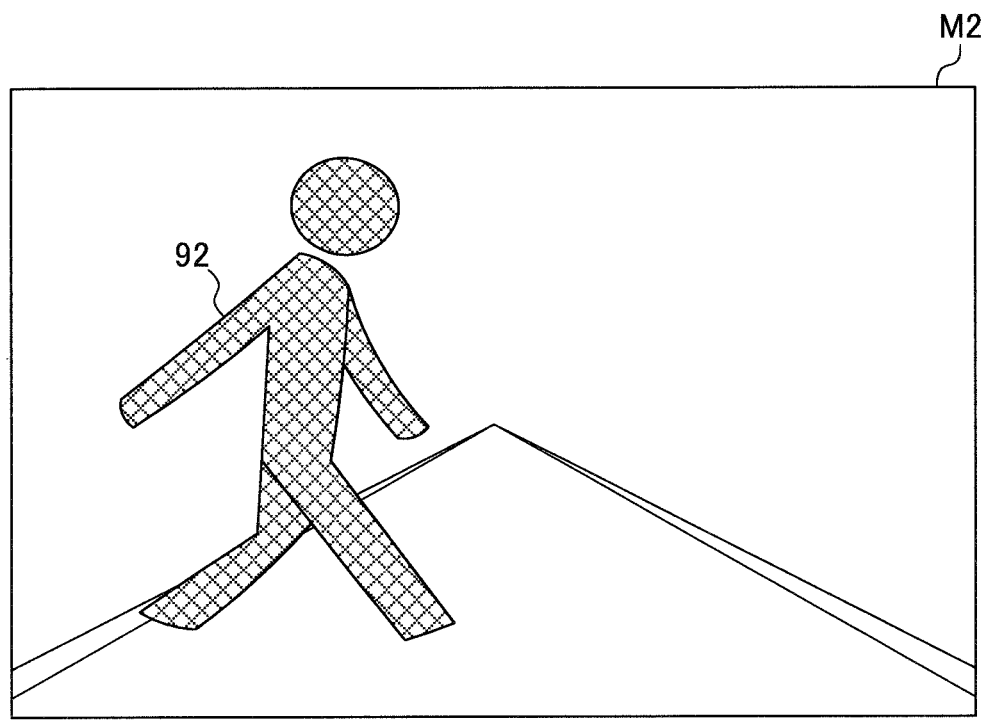
FIG. 5(A) is an illustration showing the case where the entire body of a pedestrian is contained in the heading direction image.

FIG. 5(A) shows a heading direction image M2 which was captured when the distance between the vehicle 10 and a pedestrian 92 (the pedestrian 92 is an adult, and "92" is assigned to the camera detected object as an identifier) was relatively short and which includes an image of the whole body of the pedestrian. In this case, the reliability Rc(92) is "3."

Figure 5B:
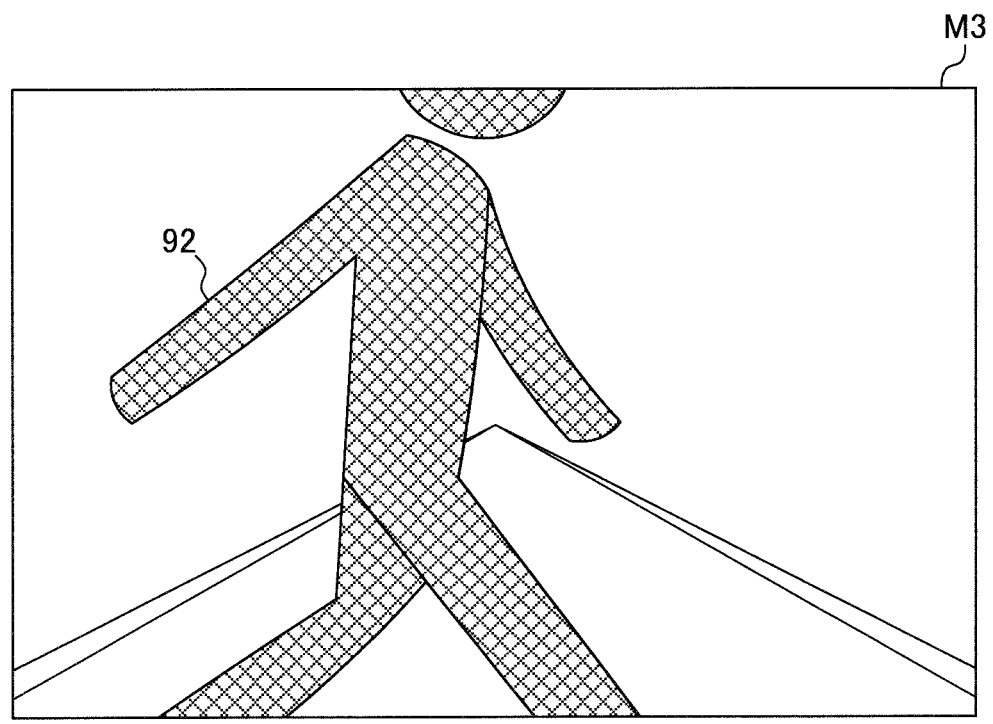
FIG. 5(B) is an illustration showing the case where the entire body of the pedestrian is not contained in the heading direction image.

However, when the pedestrian 92 further approaches the vehicle 10, as can be understood from a heading direction image M3 shown in FIG. 5(B), the heading direction image includes an image of only a portion of the whole body of the pedestrian. In this case, the degree of similarity between the pedestrian 92 in the heading direction image and the pedestrian template decreases and the reliability Rc(92) becomes smaller than "3."

Specially, each of many pedestrian templates is composed of a combination of the trunk and the "head, upper limbs, and lower limbs" extending from the trunk. Therefore, when the image of the whole body of a pedestrian is not contained in the heading direction image, the reliability Rc(a) associated with that pedestrian becomes small.

Figure 6A:
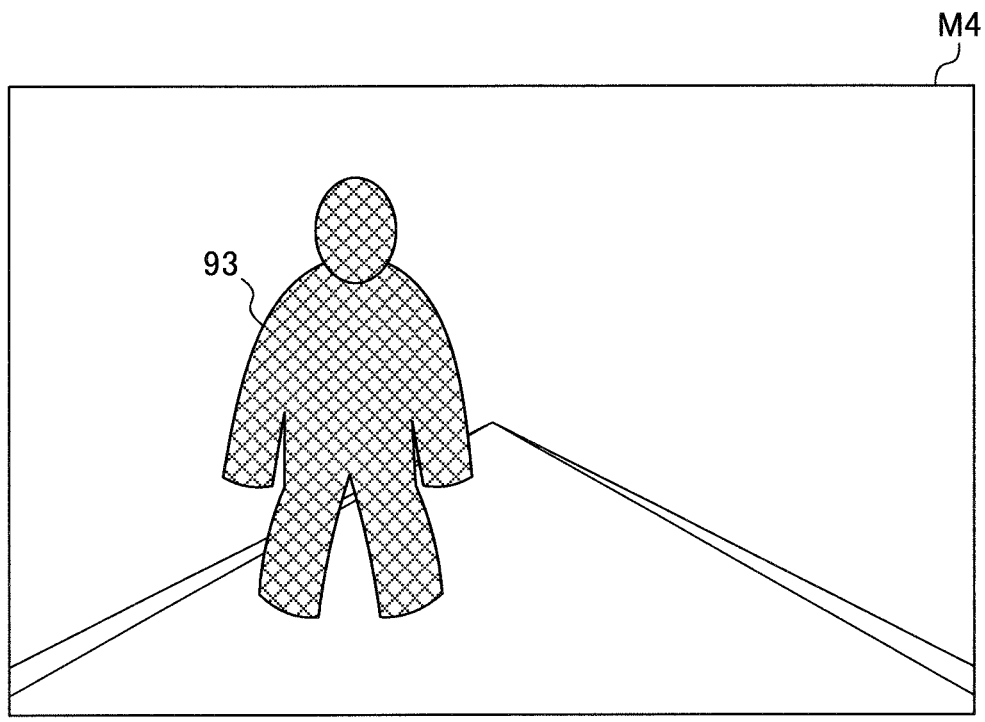
FIG. 6(A) is an illustration showing the case where the distance between a pedestrian of small stature and the present vehicle is relatively long.

Meanwhile, in the case where the pedestrian is a child shorter in stature than an adult, the possibility that the heading direction image contains the image of the whole body of the pedestrian even when the pedestrian approaches the vehicle 10 is high as compared with the case where the pedestrian is an adult. For example, FIG. 6(A) shows a heading direction image M4 which was captured when the distance between the vehicle 10 and a pedestrian 93 (the pedestrian 93 is a child, and "93" is assigned to the camera detected object as an identifier) was relatively short. The longitudinal position Dcx(93) of the pedestrian 93 in FIG. 6(A) is approximately the same as the longitudinal position Dcx(92) of the pedestrian 92 in FIG. 5(A).

Figure 6B:
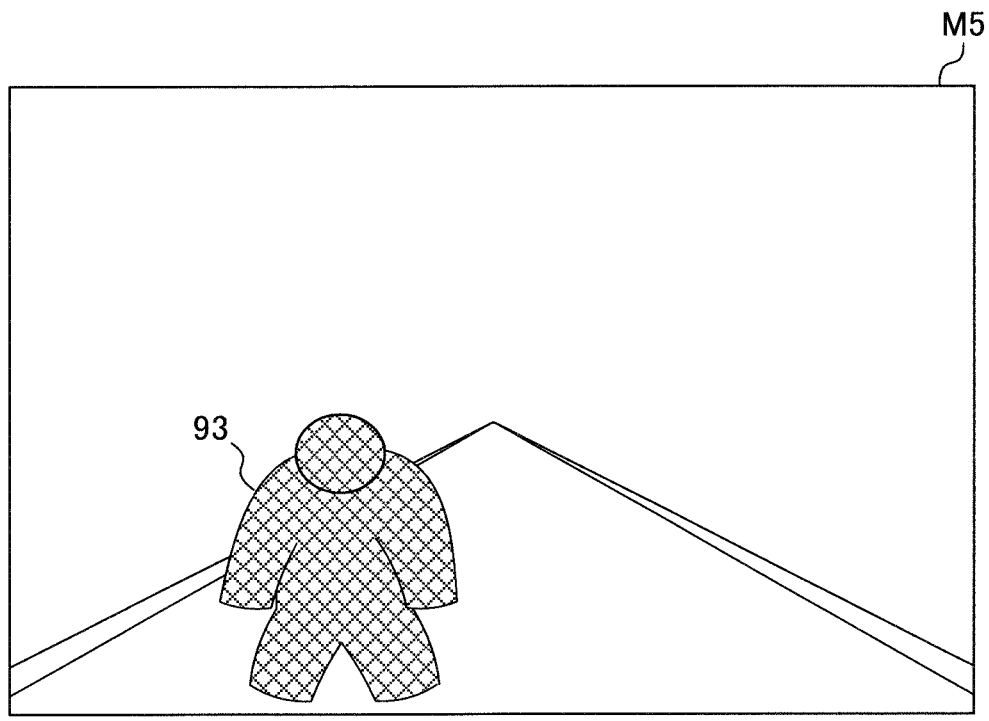
FIG. 6(B) is an illustration showing the case where the distance between the pedestrian of small stature and the present vehicle is considerably short.

FIG. 6(B) shows a heading direction image M5 captured when the distance between the pedestrian 93 and the vehicle 10 became shorter. The longitudinal position Dcx(93) of the pedestrian 93 in FIG. 6(B) is approximately the same as the longitudinal position Dcx(92) of the pedestrian 92 in FIG. 5(B).

Since the pedestrian 93 is shorter in stature than the pedestrian 92, as can be understood from FIG. 6(B), the heading direction image M5 contains the image of the whole body of the pedestrian 93 unlike the heading direction image M3 of FIG. 5(B). However, since the pedestrian 93 is short in stature, the heading direction image M5 includes a look down image (a bird's-eye view) of the pedestrian 93 as viewed from the upper side.

As a result, the possibility that the degree of similarity between the pedestrian 93 in the heading direction image M5 of FIG. 6(B) and the pedestrian template decreases becomes high. Specifically, as a result of the pedestrian 93 having approached the vehicle 10, the image of the pedestrian 93 in the heading direction image M5 becomes a look down image, and consequently, the trunk and head of the pedestrian 93 overlap each other in a larger area. Similarly, the trunk and upper limbs of the pedestrian 93 overlap each other in a larger area. Therefore, the degree of similarity between the pedestrian 93 in the heading direction image M5 and the pedestrian template decreases, and as a result, the reliability Rc(93) obtained on the basis of the heading direction image M5 becomes lower than the reliability Rc(93) obtained on the basis of the heading direction image M4.

From the above, it can be understood that when the longitudinal position Dcx(a) of the object (a) becomes excessively small, the possibility that the reliability Rc(a) becomes smaller is high as compared with the case where the longitudinal position Dcx(a) is relatively large. Accordingly, when the camera control target candidate is selected, a higher priority is given to the required deceleration Dcrq(a) over the reliability Rc(a).

(Specific Operation—Collision Avoidance Control Routine)

Next, specific operation of the surroundings monitoring ECU 20 will be described. The CPU of the surroundings monitoring ECU 20 (hereinafter may be referred to as the "CPU" for simplification) executes a "collision avoidance control routine" represented by a flowchart in FIG. 7 every time the time interval Δtc elapses.

Figure 7:
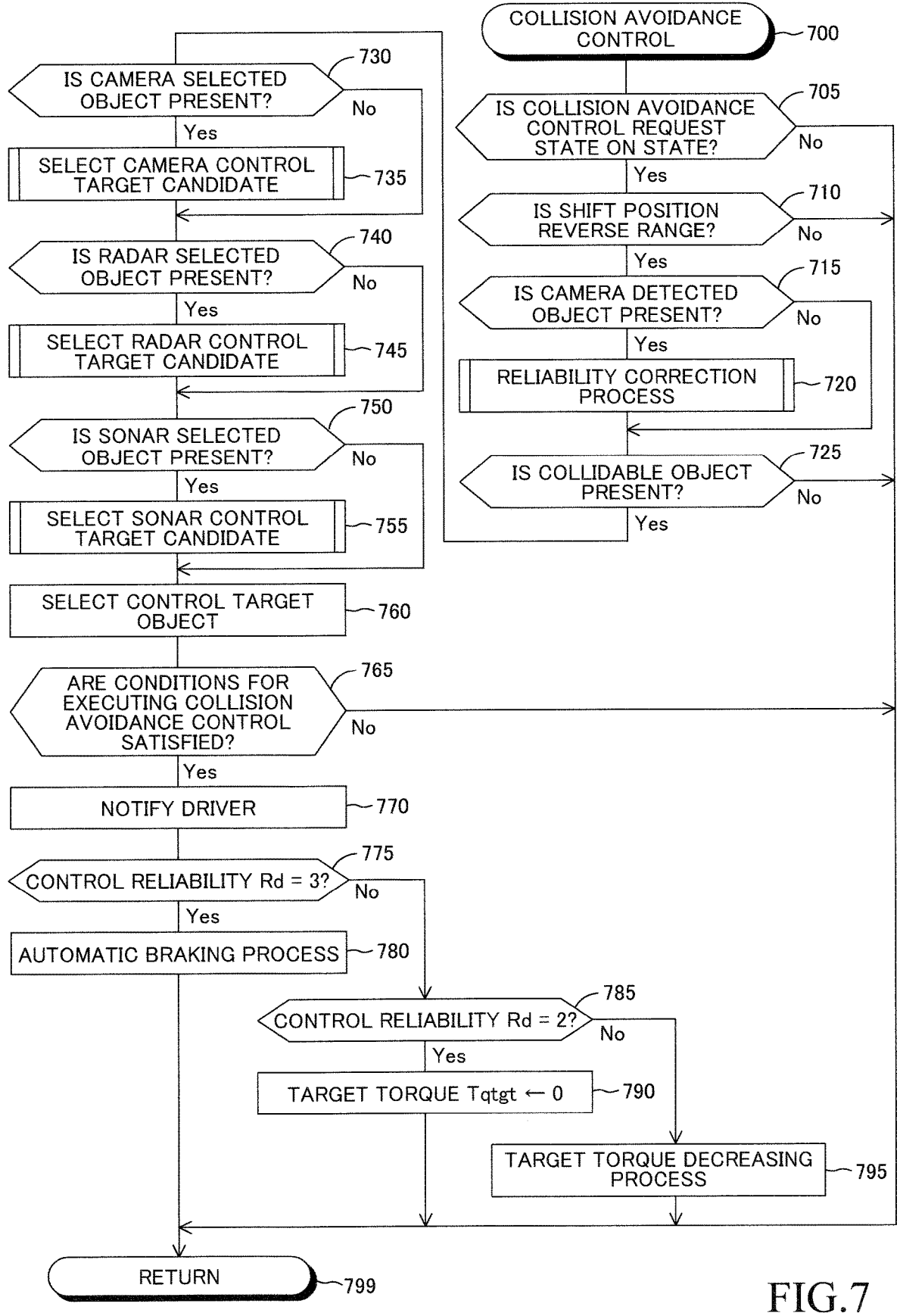
FIG. 7 is a flowchart representing a collision avoidance control routine executed by the present monitoring apparatus.

Accordingly, when a proper timing has come, the CPU starts the process from step 700 of FIG. 7 and proceeds to step 705 so as to determine whether or not the request state of collision avoidance control set by the driver of the vehicle 10 through the input output device 47 is the ON state. In the case where the collision avoidance control request state is the OFF state, the CPU makes a "No" determination in step 705 and proceeds directly to step 799 so as to end the present routine.

Meanwhile, in the case where the collision avoidance control request state is the ON state, the CPU makes a "Yes" determination in step 705 and proceeds to step 710 so as to determine whether or not the shift position detected by the shift position sensor 44 is the reverse (R) range.

In the case where the shift position is not the reverse (R) range, the CPU makes a "No" determination in step 710 and proceeds directly to step 799. Meanwhile, in the case where the shift position is the reverse (R) range, the CPU makes a "Yes" determination in step 710 and proceeds to step 715 so as to determine whether or not a camera detected object(s) is present.

In the case where a camera detected object(s) is present, the CPU makes a "Yes" determination in step 715 and proceeds to step 720. In step 720, the CPU performs a reliability correction process for the camera detected object (s) by executing a "reliability correction process routine" represented by a flowchart in FIG. 8. The reliability correction process routine of FIG. 8 will be described later. Next, the CPU proceeds to step 725.

Meanwhile, in the case where no camera detected object is present, the CPU makes a "No" determination in step 715 and proceeds directly to step 725.

In step 725, the CPU determines whether or not a camera selected object(s), a radar selected object(s), and/or a sonar selected object(s) (hereinafter may be collectively referred to as a "collidable object") is present.

In the case where no collidable object is present, the CPU makes a "No" determination in step 725 and proceeds directly to step 799. Meanwhile, in the case where a collidable object(s) is present, the CPU makes a "Yes" determination in step 725 and proceeds to step 730 so as to determine whether or not a camera selected object(s) is present.

In the case where a camera selected object(s) is present, the CPU makes a "Yes" determination in step 730 and proceeds to step 735. In step 735, the CPU selects a camera control target candidate by executing a "camera control target candidate selection routine" represented by a flowchart in FIG. 9. The camera control target candidate selection routine of FIG. 9 will be described later. After execution of the camera control target candidate selection routine of FIG. 9, the CPU proceeds to step 740.

Meanwhile, in the case where no camera selected object is present, the CPU makes a "No" determination in step 730 and proceeds directly to step 740.

In step 740, the CPU determines whether or not a radar selected object(s) is present. In the case where a radar selected object(s) is present, the CPU makes a "Yes" determination in step 740 and proceeds to step 745. In step 745, the CPU selects a radar control target candidate by executing a "radar control target candidate selection routine" represented by a flowchart in FIG. 10. The radar control target candidate selection routine of FIG. 10 will be described later. After execution of the radar control target candidate selection routine of FIG. 10, the CPU proceeds to step 750.

Meanwhile, in the case where no radar selected object is present, the CPU makes a "No" determination in step 740 and proceeds directly to step 750.

In step 750, the CPU determines whether or not a sonar selected object(s) is present. In the case where a sonar selected object(s) is present, the CPU makes a "Yes" determination in step 750 and proceeds to step 755. In step 755, the CPU selects a sonar control target candidate by executing a "sonar control target candidate selection routine" represented by a flowchart in FIG. 11. The sonar control target candidate selection routine of FIG. 11 will be described later. After execution of the sonar control target candidate selection routine of FIG. 11, the CPU proceeds to step 760.

Meanwhile, in the case where no sonar selected object is present, the CPU makes a "No" determination in step 750 and proceeds directly to step 760.

In step 760, the CPU selects a control target object. More specifically, the CPU selects, as the control target object, an object having the maximum required deceleration (namely, the largest one of the required deceleration Dcrq(a), the required deceleration Dsrq(b), and the required deceleration Drrq(c)) from among the camera control target candidate, the radar control target candidate, and the sonar control target candidate. In addition, the CPU obtains, as control deceleration Ddrq, the required deceleration for the selected control target object, and obtains, as control reliability Rd, the reliability (namely, one of the reliability Rc(a), the reliability Rr(b), and the reliability Rs(c)) for the selected control target object.

Next, the CPU proceeds to step 765 so as to determine whether or not conditions for executing the collision avoidance control are satisfied. The conditions for executing the collision avoidance control are satisfied upon satisfaction of both the following conditions (C1) and (C2).

The control deceleration Ddrq is greater than the acceleration threshold Ath. (C1)

The control reliability Rd is equal to or greater than "1." (C2)

In the case where the conditions for executing the collision avoidance control are not satisfied, the CPU makes a "No" determination in step 765 and proceeds directly to step 799. Accordingly, in this case, the collision avoidance control is not executed.

Meanwhile, in the case where the conditions for executing the collision avoidance control are satisfied, the CPU makes a "Yes" determination in step 765 and proceeds to step 770 so as to notify the driver of the vehicle 10 that the possibility of collision with the object present in the backward direction of the vehicle 10 is high. Specifically, the CPU causes the input output device 47 to display a symbol which indicates that the possibility of collision with the object present in the backward direction of the vehicle 10 is high and causes the speakers 48 to reproduce a warning sound.

Subsequently, the CPU proceeds to step 775 so as to determine whether or not the control reliability Rd of the control target object is "3." In the case where the control reliability Rd is "3," the CPU makes a "Yes" determination in step 775 and proceeds to step 780 so as to execute an "automatic braking process."

More specifically, in step 780, the CPU sets the target drive torque Tqtgt to "0" and sends a request signal to the engine ECU 31 so as to render the actual drive torque Td coincident with the target drive torque Tqtgt. As a result, the engine ECU 31 controls the engine actuators 53 and the transmission 54 by executing an unillustrated routine such that the actual drive torque Td becomes equal to the target drive torque Tqtgt.

In addition, the CPU sends a request signal to the brake ECU 32 so as to render the magnitude |Asi of the actual acceleration As coincident with the control deceleration Ddrq. As a result, the brake ECU 32 controls the brake actuator 56 by executing an unillustrated routine so as to generate the braking force Bf such that the magnitude |As| of the actual acceleration As becomes equal to the control deceleration Ddrq. Subsequently, the CPU proceeds to step 799.

Meanwhile, in the case where the determination condition of step 775 is not satisfied (namely, the control reliability Rd is not "3"), the CPU makes a "No" determination in step 775 and proceeds to step 785 so as to determine whether or not the control reliability Rd of the control target object is "2." In the case where the control reliability Rd of the control target object is "2," the CPU makes a "Yes" determination in step 785 and proceeds to step 790.

In step 790, the CPU sets the target drive torque Tqtgt to "0" and sends a request signal to the engine ECU 31 so as to render the actual drive torque Td coincident with the target drive torque Tqtgt (namely, "0"). Subsequently, the CPU proceeds to step 799.

Meanwhile, in the case where the determination condition of step 785 is not satisfied (namely, the control reliability Rd is not "2"), the CPU makes a "No" determination in step 785 and proceeds to step 795 so as to execute a "target torque decreasing process." Specifically, in step 795, the CPU sets the target drive torque Tqtgt to a value smaller than the requested drive torque Tr (namely, k·Tth or k·Tr) by the above-described process and sends a request signal to the engine ECU 31 so as to render the actual drive torque Td coincident with the target drive torque Tqtgt. Subsequently, the CPU proceeds to step 799.

(Specific Operation—Reliability Correction Process Routine)

Next, the reliability correction process routine of FIG. 8 will be described. When the CPU proceeds to step 720 of FIG. 7, the CPU starts the process from step 800 of FIG. 8 and proceeds to step 805. In step 805, the CPU selects an object (a) which is one of the camera detected objects and stores the reliability Rc(a) and longitudinal position Dcx(a) of the object (a) in the RAM of the surroundings monitoring ECU 20.

The reliability Rc(a) stored in the RAM by the process of step 805 is referred to as the reliability Rc0(a) when the processes of step 810 and step 815 subsequent to step 805 are executed, and is also referred to as the reliability Rc1(a) by the processes of step 810 and step 815 which are executed when the present routine is executed next time. Further, when the present routine is again executed after the next time (namely, when a "period of time corresponding to double the time interval Δtc" elapses from the present point in time), the reliability Rc(a) stored in the RAM by the process of step 805 is referred to as the reliability Rc2(a) by the processes of step 810 and step 815.

Figure 9:
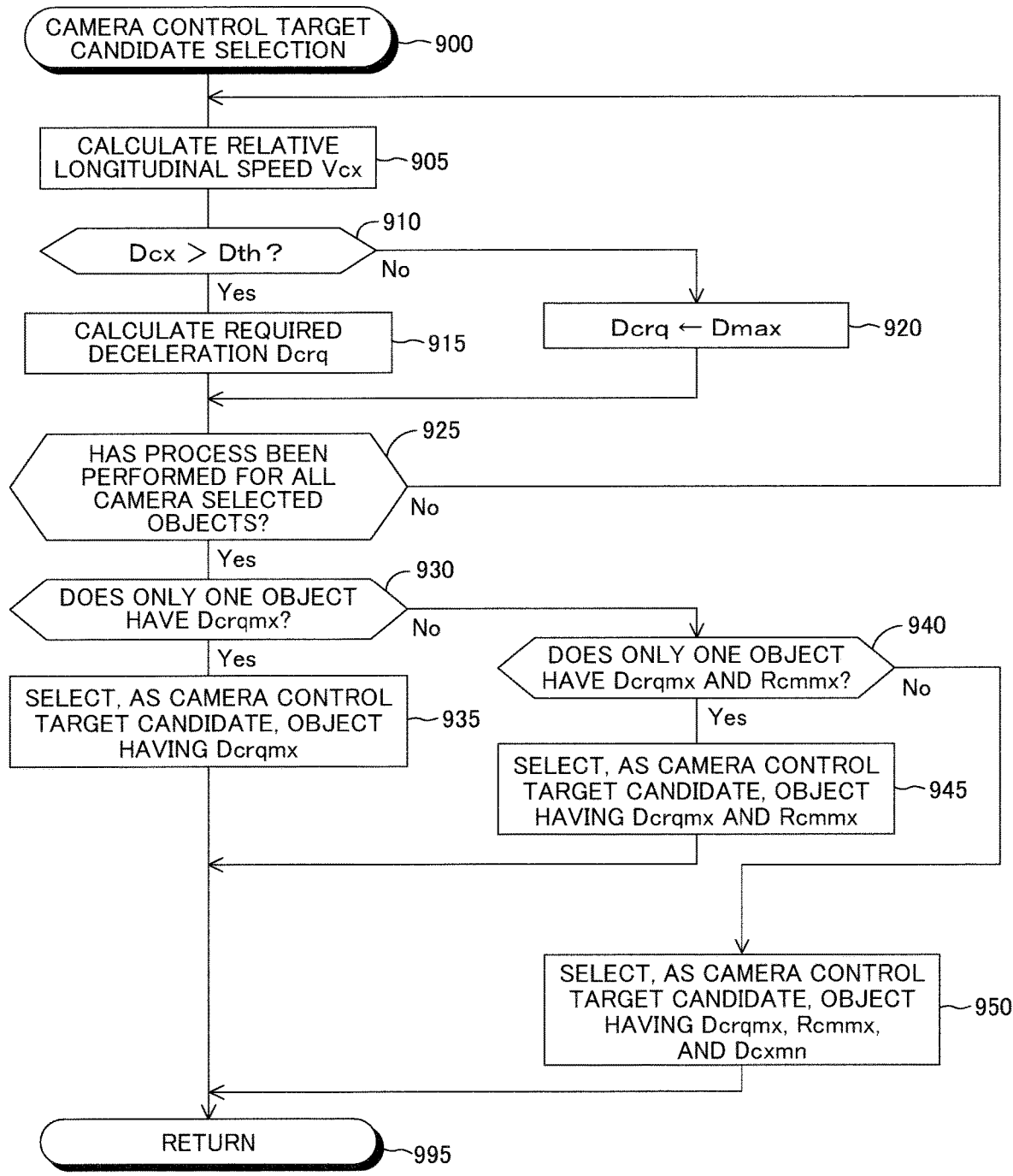
FIG. 9 is a flowchart representing a camera control target candidate selection routine executed by the present monitoring apparatus.

Meanwhile, the longitudinal position Dcx(a) stored in the RAM by the process of step 805 is referred to as the previous longitudinal position Dcxp(a) for calculation of the relative longitudinal speed Vcx(a) of the object (a) in the camera control target candidate selection routine of FIG. 9 which is called when the collision avoidance control routine of FIG. 7 having called the present routine is executed next time (namely when the time interval Δtc elapses from the present point in time).

Subsequently, the CPU proceeds to step 810 so as to obtain, as the maximum reliability Rcmax(a), the largest one of the "reliability Rc0(a), reliability Rc1(a), and reliability Rc2(a)" of the object (a). Subsequently, the CPU proceeds to step 815 so as to obtain, as the minimum reliability Rcmin(a), the smallest one of the "reliability Rc0(a), reliability Rc1(a), and reliability Rc2(a)" of the object (a).

Notably, in the case where the reliability Rc(a) corresponding to the reliability Rc1(a) is not stored in the RAM, the reliability Rc1(a) is set to "0." Similarly, in the case where the reliability Rc(a) corresponding to the reliability Rc2(a) is not stored in the RAM, the reliability Rc2(a) is set to "0."

Further, the CPU proceeds to step 820 so as to determine whether or not the previous corrected reliability Rcmp(a) is equal to or greater than the maximum reliability Rcmax(a). In the case where the previous corrected reliability Rcmp(a) is equal to or greater than the maximum reliability Rcmax(a), the CPU makes a "Yes" determination in step 820 and proceeds to step 825 so as to store the maximum reliability Rcmax(a) in a memory area of the RAM of the surroundings monitoring ECU 20 for the corrected reliability Rcm(a). Subsequently, the CPU proceeds to step 845.

Meanwhile, in the case where the previous corrected reliability Rcmp(a) is less than the maximum reliability Rcmax(a), the CPU makes a "No" determination in step 820 and proceeds to step 830 so as to determine whether or not the previous corrected reliability Rcmp(a) is equal to or less than the minimum reliability Rcmin(a).

In the case where the previous corrected reliability Rcmp(a) is equal to or less than the minimum reliability Rcmin(a), the CPU makes a "Yes" determination in step 830 and proceeds to step 835 so as to store the minimum reliability Rcmin(a) in the memory area of the RAM for the corrected reliability Rcm(a). Subsequently, the CPU proceeds to step 845.

Meanwhile, in the case where the previous corrected reliability Rcmp(a) is greater than the minimum reliability Rcmin(a), the CPU makes a "No" determination in step 830 and proceeds to step 840 so as to store the previous corrected reliability Rcmp(a) in the memory area of the RAM for the corrected reliability Rcm(a). Subsequently, the CPU proceeds to step 845.

In step 845, the CPU determines whether or not the above-described process has been executed for all the camera detected objects. In the case where a camera detected object(s) for which the above-described process has not yet been performed remains, the CPU makes a "No" determination in step 845 and proceeds to step 805. As a result, one camera detected object for which the above-described process has not yet been performed is selected, and the above-described process is executed for that object.

Meanwhile, in the case where the above-described process has been executed for all the camera detected objects, the CPU makes a "Yes" determination in step 845 and proceeds to step 895 so as to end the present routine. Namely, the CPU proceeds to step 725 of FIG. 7.

(Specific Operation—Camera Control Target Candidate Selection Routine)

Next, the camera control target candidate selection routine of FIG. 9 will be described. When the CPU proceeds to step 735 of FIG. 7, the CPU starts the process from step 900 of FIG. 9 and proceeds to step 905. In step 905, the CPU selects an object (a) which is one of the camera selected objects and calculates the relative longitudinal speed Vcx(a) of the object (a) in accordance with the above-described expression (1).

Figure 8:
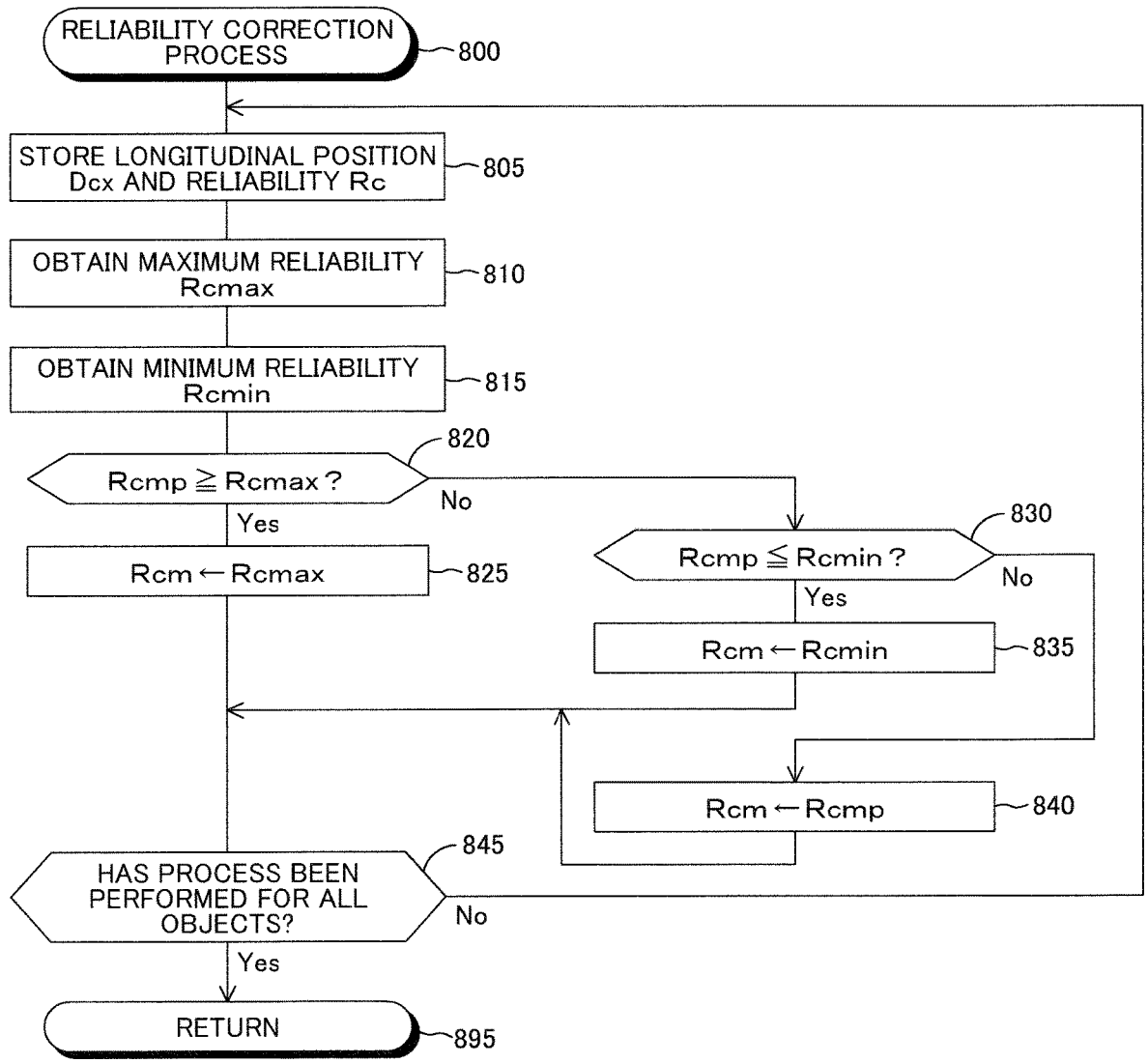
FIG. 8 is a flowchart representing a reliability correction process routine executed by the present monitoring apparatus.

Notably, in the case where the previous longitudinal position Dcxp(a) (namely, the longitudinal position Dcx(a) stored in the RAM of the surroundings monitoring ECU 20 by the process of step 805 of FIG. 8 executed at the point in time prior to the present point in time by the time interval Δtc) cannot be obtained for the calculation of the relative longitudinal speed Vcx(a), the CPU sets the relative longitudinal speed Vcx(a) to "0."

Subsequently, the CPU proceeds to step 910 so as to determine whether or not the longitudinal position Dcx(a) of the object (a) is greater than the distance threshold Dth. In the case where the longitudinal position Dcx(a) is greater than the distance threshold Dth, the CPU makes a "Yes" determination in step 910 and proceeds to step 915 so as to calculate the required deceleration Dcrq(a) of the object (a) in accordance with the above-described expression (2). Subsequently, the CPU proceeds to step 925.

Meanwhile, in the case where the longitudinal position Dcx(a) is equal to or less than the distance threshold Dth, the CPU makes a "No" determination in step 910 and proceeds to step 920 so as to set the required deceleration Dcrq(a) to the maximum deceleration Dmax. Subsequently, the CPU proceeds to step 925.

In step 925, the CPU determines whether or not the above-described process has been executed for all the camera selected objects. In the case where a camera selected object(s) for which the above-described process has not yet been performed remains, the CPU makes a "No" determination in step 925 and proceeds to step 905. As a result, one camera selected object for which the above-described process has not yet been performed is selected, and the above-described process is executed for that object.

Meanwhile, in the case where the above-described process has been executed for all the camera selected objects, the CPU makes a "Yes" determination in step 925 and proceeds to step 930. In step 930, the CPU determines whether or not a "single" camera selected object has the maximum required deceleration Dcrqmx among the camera selected objects.

In the case where a "single" camera selected object has the maximum required deceleration Dcrqmx, the CPU makes a "Yes" determination in step 930 and proceeds to step 935 so as to select, as the camera control target candidate, the camera selected object having the maximum required deceleration Dcrqmx. Subsequently, the CPU proceeds to step 995 and ends the present routine. Namely, the CPU proceeds to step 740 of FIG. 7.

Meanwhile, in the case where a plurality of camera selected objects have the same maximum required deceleration Dcrqmx, the CPU makes a "No" determination in step 930 and proceeds to step 940 so as to determine whether or not a "single" camera selected object has the maximum required deceleration Dcrqmx and the maximum corrected reliability Rcmmx.

In the case where a "single" camera selected object has the maximum required deceleration Dcrqmx and the maximum corrected reliability Rcmmx, the CPU makes a "Yes" determination in step 940 and proceeds to step 945 so as to select, as the camera control target candidate, the camera selected object having the maximum required deceleration Dcrqmx and the maximum corrected reliability Rcmmx. Subsequently, the CPU proceeds to step 995.

Meanwhile, in the case where a plurality of camera selected objects have the same maximum required deceleration Dcrqmx and the same maximum corrected reliability Rcmmx, the CPU makes a "No" determination in step 940 and proceeds to step 950 so as to select, as the camera control target candidate, a camera selected object having the maximum required deceleration Dcrqmx, the maximum corrected reliability Rcmmx, and the minimum longitudinal position Dcxmn. Subsequently, the CPU proceeds to step 995.

(Specific Operation—Radar Control Target Candidate Selection Routine)

Figure 10:
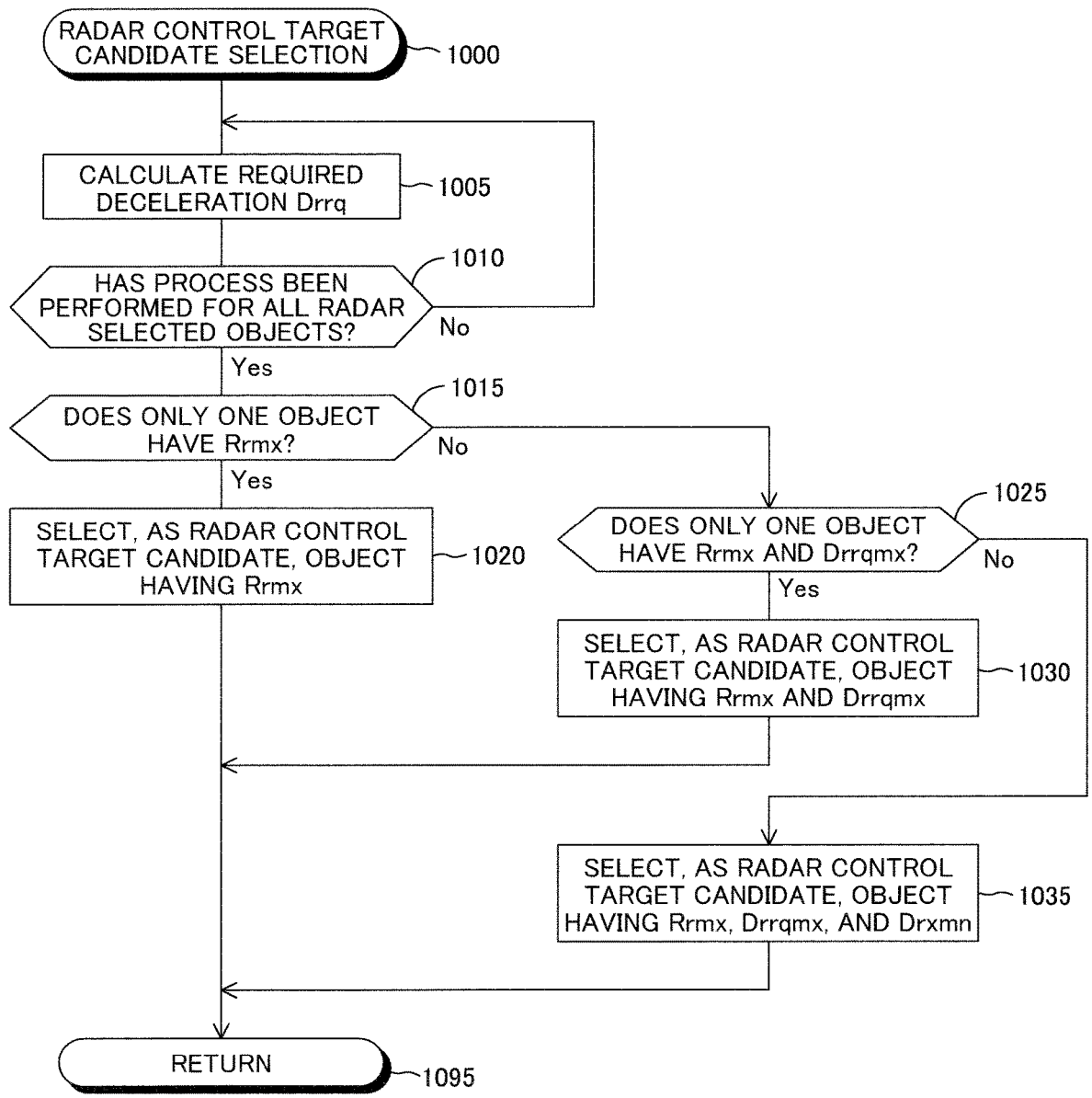
FIG. 10 is a flowchart representing a radar control target candidate selection routine executed by the present monitoring apparatus.

Next, the radar control target candidate selection routine of FIG. 10 will be described. When the CPU proceeds to step 745 of FIG. 7, the CPU starts the process from step 1000 of FIG. 10 and proceeds to step 1005. In step 1005, the CPU selects an object (b) which is one of the radar selected objects and calculates (obtains) the required deceleration Drrq(b) for the object (b) in accordance with the above-described expression (3).

Subsequently, the CPU proceeds to step 1010 so as to determine whether or not the required deceleration Drrq(b) has been obtained for all the radar selected objects. In the case where a radar selected object(s) for which the required deceleration Drrq(b) has not yet been obtained remains, the CPU makes a "No" determination in step 1010 and proceeds to step 1005. As a result, a radar selected object (object (b)) for which the required deceleration Drrq(b) has not yet been obtained is selected, and the required deceleration Drrq(b) is obtained for that object (b).

Meanwhile, in the case where the required deceleration Drrq(b) has been obtained for all the radar selected objects, the CPU makes a "Yes" determination in step 1010 and proceeds to step 1015. In step 1015, the CPU determines whether or not a "single" radar selected object has the maximum reliability Rrmx.

In the case where a "single" radar selected object has the maximum reliability Rrmx, the CPU makes a "Yes" determination in step 1015 and proceeds to step 1020 so as to select, as the radar control target candidate, the radar selected object having the maximum reliability Rrmx. Subsequently, the CPU proceeds to step 1095 and ends the present routine. Namely, the CPU proceeds to step 750 of FIG. 7.

Meanwhile, in the case where a plurality of radar selected objects have the same maximum reliability Rrmx, the CPU makes a "No" determination in step 1015 and proceeds to step 1025 so as to determine whether or not a "single" radar selected object has the maximum reliability Rrmx and the maximum required deceleration Drrqmx.

In the case where a "single" radar selected object has the maximum reliability Rrmx and the maximum required deceleration Drrqmx, the CPU makes a "Yes" determination in step 1025 and proceeds to step 1030 so as to select, as the radar control target candidate, the radar selected object having the maximum reliability Rrmx and the maximum required deceleration Drrqmx. Subsequently, the CPU proceeds to step 1095.

Meanwhile, in the case where a plurality of radar selected objects have the same maximum reliability Rrmx and the same maximum required deceleration Drrqmx, the CPU makes a "No" determination in step 1025 and proceeds to step 1035 so as to select, as the radar control target candidate, a radar selected object having the maximum reliability Rrmx, the maximum required deceleration Drrqmx, and the minimum longitudinal position Drxmn. Subsequently, the CPU proceeds to step 1095.

(Specific Operation—Sonar Control Target Candidate Selection Routine)

Figure 11:
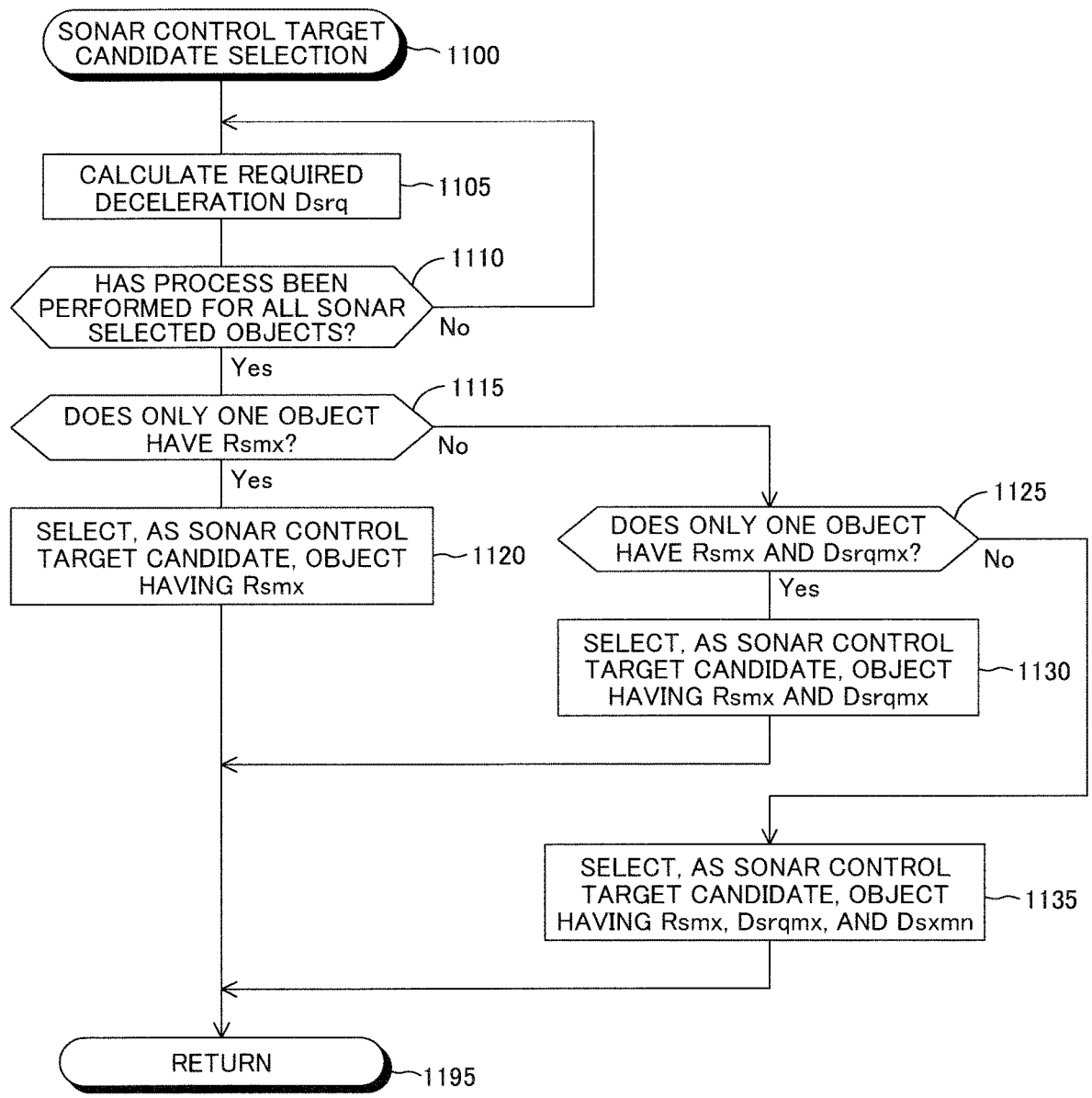
FIG. 11 is a flowchart representing a sonar control target candidate selection routine executed by the present monitoring apparatus.

Next, the sonar control target candidate selection routine of FIG. 11 will be described. When the CPU proceeds to step 755 of FIG. 7, the CPU starts the process from step 1100 of FIG. 11 and proceeds to step 1105. In step 1105, the CPU selects an object (c) which is one of the sonar selected objects and calculates (obtains) the required deceleration Dsrq(c) for the object (c) in accordance with the above-described expression (4).

Subsequently, the CPU proceeds to step 1110 so as to determine whether or not the required deceleration Dsrq(c) has been obtained for all the sonar selected objects. In the case where a sonar selected object(s) for which the required deceleration Dsrq(c) has not yet been obtained remains, the CPU makes a "No" determination in step 1110 and proceeds to step 1105. As a result, a sonar selected object (object (c)) for which the required deceleration Dsrq(c) has not yet been obtained is selected, and the required deceleration Dsrq(c) is obtained for that object (c).

Meanwhile, in the case where the required deceleration Dsrq(c) has been obtained for all the sonar selected objects, the CPU makes a "Yes" determination in step 1110 and proceeds to step 1115. In step 1115, the CPU determines whether or not a "single" sonar selected object has the maximum reliability Rsmx.

In the case where a "single" sonar selected object has the maximum reliability Rsmx, the CPU makes a "Yes" determination in step 1115 and proceeds to step 1120 so as to select, as the sonar control target candidate, the sonar selected object having the maximum reliability Rsmx. Subsequently, the CPU proceeds to step 1195 and ends the present routine. Namely, the CPU proceeds to step 760 of FIG. 7.

Meanwhile, in the case where a plurality of sonar selected objects have the same maximum reliability Rsmx, the CPU makes a "No" determination in step 1115 and proceeds to step 1125 so as to determine whether or not a "single" sonar selected object has the maximum reliability Rsmx and the maximum required deceleration Dsrqmx.

In the case where a "single" sonar selected object has the maximum reliability Rsmx and the maximum required deceleration Dsrqmx, the CPU makes a "Yes" determination in step 1125 and proceeds to step 1130 so as to select, as the sonar control target candidate, the sonar selected object having the maximum reliability Rsmx and the maximum required deceleration Dsrqmx. Subsequently, the CPU proceeds to step 1195.

Meanwhile, in the case where a plurality of sonar selected objects have the same maximum reliability Rsmx and the same maximum required deceleration Dsrqmx, the CPU makes a "No" determination in step 1125 and proceeds to step 1135 so as to select, as the sonar control target candidate, a sonar selected object having the maximum reliability Rsmx, the maximum required deceleration Dsrqmx, and the minimum longitudinal position Dsxmn. Subsequently, the CPU proceeds to step 1195.

As described above, according to the present monitoring apparatus, a camera control target candidate (accordingly, a control target object) can be appropriately selected from among camera detected objects extracted from a heading direction image captured by the camera apparatus 41, so that the possibility that the collision of the vehicle 10 with an object can be avoided by the collision avoidance control becomes high. In addition, according to the present monitoring apparatus, even when the reliability Rc(a) changes (fluctuates), the camera detected objects can be appropriately selected on the basis of the corrected reliability Rcm(a) obtained through the reliability correction process, whereby the control target object can be selected appropriately. Further, according to the present monitoring apparatus, in the case where the vehicle 10 includes the radar apparatus 42 and the sonar apparatus 43 in addition to the camera apparatus 41, the control target object can be selected appropriately from among the camera detected objects, the radar detected objects, and the sonar detected objects.

The embodiment of the surroundings monitoring apparatus according to the present invention has been described; however, the present invention is not limited to the above-described embodiment, and various modifications are possible without departing from the scope of the invention. For example, the surroundings monitoring ECU 20 according to the present embodiment executes the collision avoidance control when the vehicle 10 moves backward. However, the surroundings monitoring ECU 20 may execute the collision avoidance control when the vehicle 10 moves forward. In this case, the vehicle 10 includes an onboard camera (front camera) for capturing an image of a front region. Similarly, the vehicle 10 includes a radar apparatus and a sonar apparatus for detecting objects present in the forward direction of the vehicle 10.

In the present embodiment, the radar apparatus 42 is an object detector (millimeter wave radar) which transmits an electromagnetic wave in the millimeter wave band as a radar transmission wave, and the sonar apparatus 43 is an object detector (ultrasonic sonar) which transmits an ultrasonic wave as a sonar transmission wave. However, in addition to or in place of the radar apparatus 42 and the sonar apparatus 43, the vehicle 10 may include a different object detector. For example, the vehicle 10 may include a submillimeter wave radar which transmits an electromagnetic wave in the 24 GHz band as a radar transmission wave.

In the present embodiment, the vehicle 10 includes the camera apparatus 41, the radar apparatus 42, and the sonar apparatus 43. However, the vehicle 10 may detect an object by using the camera apparatus 41 only. In this case, the vehicle 10 does not include the radar apparatus 42 and the sonar apparatus 43.

In the present embodiment, the surroundings monitoring ECU 20 obtains the corrected reliability Rcm(a) by executing the reliability correction process. However, the reliability correction process may be omitted. In this case, the surroundings monitoring ECU 20 selects the camera control target candidate on the basis of the reliability Rc(a) instead of the corrected reliability Rcm(a).

In the present embodiment, the surroundings monitoring ECU 20 performs the reliability correction process by executing the reliability correction process routine of FIG. 8. However, the surroundings monitoring ECU 20 may perform the reliability correction process by executing a different process routine. For example, the surroundings monitoring ECU 20 may obtain, as the corrected reliability Rcm(a), the average of the reliability Rc0(a), the reliability Rc1(a), and the reliability Rc2(a).

In the present embodiment, when the longitudinal position Dcx(a) of a camera detected object is positive and is less than the distance threshold Dth, the surroundings monitoring ECU 20 sets the required deceleration Dcrq(a) to the predetermined maximum deceleration Dmax such that that object is selected as the control target object. Similarly, when the longitudinal position Drx(b) of a radar detected object is positive and is less than the distance threshold Dth, the surroundings monitoring ECU 20 may select that object (b) as the control target object. Alternatively, when the longitudinal position Dsx(c) of a sonar detected object is positive and is less than the distance threshold Dth, the surroundings monitoring ECU 20 may select that object (c) as the control target object.

In the present embodiment, the acceleration threshold Ath is a fixed value. However, the acceleration threshold Ath may be a value which changes with the conditions. For example, the acceleration threshold Ath may be set such that the larger the magnitude |Vs| of the vehicle speed Vs, the greater the value to which the acceleration threshold Ath is set.

In the present embodiment, when the magnitude of the lateral position (Dcy(a), Dry(b), or Dsy(c)) of an object is smaller than the value obtained by adding the predetermined width margin Ld to a half of the vehicle width Lw (i.e., Lw/2), the surroundings monitoring ECU 20 determines that the object is an object (collidable object) which is likely to collide with the vehicle 10 when the vehicle 10 moves backward. However, the surroundings monitoring ECU 20 may determine whether or not the detected object is a collidable object by a different method. For example, the surroundings monitoring ECU 20 may determine whether or not an object is a collidable object on the basis of the results of determination as to whether or not the object is contained in a region which is estimated on the basis of the steering angle of the steering wheel of the vehicle 10 and through which the vehicle 10 passes when the vehicle 10 moves backward.

What is claimed is:

1. A surroundings monitoring apparatus comprising:
   an onboard camera which is mounted on a vehicle and which obtains a heading direction image by photographing a region in a heading direction of said vehicle;
   a controller which is implemented by at least one programmed processor and configured to:
   obtain camera detected positions and reliability index values for camera detected objects that are objects contained in said heading direction image, said camera detected positions being relative positions of said camera detected objects in relation to said vehicle determined on the basis of positions of said camera detected objects in said heading direction image, said reliability index values representing reliabilities in obtaining said camera detected positions;
   select, as a camera control target candidate, one of said camera detected objects which are likely to collide with said vehicle when said vehicle travels, in such a manner that, when there exists a single object which is the largest in camera required deceleration which is a magnitude of acceleration of said vehicle required for avoiding collision with said camera detected object and is calculated on the basis of said camera detected position, the object which is the largest in said camera required deceleration is selected as said camera control target candidate, and when there exist a plurality of objects which are the largest in said camera required deceleration, from among the plurality of objects which are the largest in said camera required deceleration, an object which is the highest in reliability represented by a reliability correlation value determined in accordance with said reliability index value is selected as said camera control target candidate;
   specify said camera control target candidate as a control target object; and
   execute a collision avoidance control for decreasing the magnitude of travel speed of said vehicle so as to avoid collision with said control target object,
   wherein the reliability index values are obtained per object such that the greater the degree of similarity between a template and a portion of the heading direction image, the greater the value to which the reliability index values are set.

2. The surroundings monitoring apparatus according to claim 1, wherein
   said controller obtains said reliability index value every time a predetermined time elapses, and obtains said reliability correlation value by smoothing a change in said reliability index value with time.

3. The surroundings monitoring apparatus according to claim 1, wherein when a longitudinal distance which is a distance between said camera detected object and said vehicle in a longitudinal direction of said vehicle is less than a predetermined distance threshold, said controller sets said camera required deceleration for said camera detected object to a predetermined deceleration equal to or greater than the maximum value of said camera required deceleration calculated for said camera detected object when said longitudinal distance is greater than said distance threshold.

4. The surroundings monitoring apparatus according to claim 3, further comprising:
   an object detector includes a radar apparatus in which said transmission wave is a millimeter electromagnetic wave and a sonar apparatus in which said transmission wave is a millimeter acoustic wave;
   a reception device, including a plurality of antennas, for receiving a reflection wave generated as a result of said transmission wave being reflected by an object; and
   wherein
   said controller obtains detector detected positions and detector detection reliabilities for detector detected objects that are objects detected on the basis of said reflection wave, said detector detected positions being relative positions of said detector detected objects in relation to said vehicle, said detector detection reliabilities representing reliabilities in obtaining said detector detected positions;
   said controller selects, as a detector control target candidate associated with the radar apparatus or the sonar apparatus, one of said detector detected objects which are likely to collide with said vehicle when said vehicle travels, in such a manner that, when there exists a single object which has the maximum reliability, said single object having the maximum reliability is selected as said detector control target candidate, and when there exist a plurality of objects which have the maximum reliability, from among the plurality of objects having the maximum reliability,
   an object which is the largest in detector required deceleration which is the magnitude of acceleration of said vehicle required for avoiding collision with said detector detected object and is calculated on the basis of said detector detected position is selected as said detector control target candidate; and
   said controller specifies, as said control target object, an object which is selected from among said camera control target candidate and said detector control target candidates and which is the largest in required deceleration to avoid the closest object among said camera required deceleration and said detector required decelerations for those objects.

5. The surroundings monitoring apparatus according to claim 4, wherein
   said controller selects, as said detector control target candidate associated with said radar apparatus, an object from among objects detected by said radar apparatus and selects, as said detector control target candidate associated with said sonar apparatus, an object from among objects detected by said sonar apparatus; and said controller specifies, as said control target object, an object which is selected from among said camera control target candidate, said detector control target candidate associated with said radar apparatus, and said detector control target candidate associated with said sonar apparatus and which is the largest in required deceleration to avoid the closest object among said camera required deceleration and said detector required decelerations for those objects.

6. The surroundings monitoring apparatus according to claim 1, further comprising:

an object detector includes a radar apparatus in which said transmission wave is a millimeter electromagnetic wave and a sonar apparatus in which said transmission wave is a millimeter acoustic wave;

a reception device, including a plurality of antennas, for receiving a reflection wave generated as a result of said transmission wave being reflected by an object; and wherein said controller obtains detector detected positions and detector detection reliabilities for detector detected objects that are objects detected on the basis of said reflection wave, said detector detected positions being relative positions of said detector detected objects in relation to said vehicle, said detector detection reliabilities representing reliabilities in obtaining said detector detected positions;

said controller selects, as a candidate for a detector control target associated with the radar apparatus or the sonar apparatus, one of said detector detected objects which are likely to collide with said vehicle when said vehicle travels, in such a manner that, when there exists a single object which has the maximum reliability, said single object having the maximum reliability is selected as said detector control target candidate, and when there exist a plurality of objects which have the maximum reliability, from among the plurality of objects having the maximum reliability, an object which is the largest in detector required deceleration which is the magnitude of acceleration of said vehicle required for avoiding collision with said detector detected object and is calculated on the basis of said detector detected position is selected as said detector control target candidate; and, said controller specifies, as said control target object, an object which is selected from among said camera control target candidate and said detector control target candidates and which is the largest in required deceleration to avoid the closest object among said camera required deceleration and said detector required decelerations for those objects, wherein when the transmission wave is transmitted a plurality of times, the detector detection reliabilities are obtained per object such that the larger number of times of reception of the reflection wave from the object by the reception device, the greater the value to which the detector detection reliabilities are set.

7. The surroundings monitoring apparatus according to claim 6, wherein said controller selects, as said detector control target candidate associated with said radar apparatus, an object from among objects detected by said radar apparatus and selects, as said detector control target candidate associated with said sonar apparatus, an object from among objects detected by said sonar apparatus; and said controller specifies, as said control target object, an object which is selected from among said camera control target candidate, said detector control target candidate associated with said radar apparatus, and said detector control target candidate associated with said sonar apparatus and which is the largest in required deceleration to avoid the closest object among said camera required deceleration and said detector required decelerations for those objects.

* * * * *